United States Patent [19]
Yang et al.

[11] Patent Number: 5,280,478
[45] Date of Patent: Jan. 18, 1994

[54] NO-OWNER FRAME AND MULTIPLE TOKEN REMOVAL MECHANISM FOR TOKEN RING NETWORKS

[75] Inventors: Henry Yang, Andover; Kadangode K. Ramakrishnan, Maynard; Paul W. Ciarfella, Arlington, all of Mass.

[73] Assignee: Digital Equipment Corporation, Maynard, Mass.

[21] Appl. No.: 558,961

[22] Filed: Jul. 27, 1990

Related U.S. Application Data

[63] Continuation-in-part of Ser. No. 400,072, Aug. 29, 1989, abandoned.

[51] Int. Cl.$^5$ .......................................... H04L 12/42
[52] U.S. Cl. .............................. 370/85.5; 340/825.05
[58] Field of Search .................. 370/85.4, 85.5, 85.15; 340/825.06, 825.05

[56] References Cited

U.S. PATENT DOCUMENTS

| | | | |
|---|---|---|---|
| 4,468,734 | 8/1984 | Lanier et al. | 364/200 |
| 4,507,777 | 3/1985 | Tucker et al. | 370/16 |
| 4,567,590 | 1/1986 | Bederman | 370/86 |
| 4,577,313 | 3/1986 | Sy | 370/85.14 |
| 4,646,232 | 2/1987 | Chang et al. | 364/200 |
| 4,789,982 | 12/1988 | Coden | 370/85 |
| 4,932,027 | 6/1990 | Geyer et al. | 370/85.5 |
| 4,941,142 | 7/1990 | Kida | 370/85.5 |
| 5,053,946 | 8/1991 | Jain | 364/200 |
| 5,142,530 | 8/1992 | Geyer et al. | 370/85.5 |

FOREIGN PATENT DOCUMENTS

| | | |
|---|---|---|
| 0119003A3 | 9/1984 | European Pat. Off. |
| 0328004A1 | 8/1989 | European Pat. Off. |
| 0354809A2 | 2/1990 | European Pat. Off. |
| 35076186 | 9/1986 | Fed. Rep. of Germany |
| WO91/03898 | 3/1991 | PCT Int'l Appl. |

OTHER PUBLICATIONS

Pending application for U.S. patent Ser. No. 07/884,321, of Yang et al, filed May 11, 1992, originally filed Aug. 12, 1988, "Frame Removal Mechanism for Token Ring Networks".

Data Communications. vol. 13, No. 9, Aug. 1984, New York, N.Y., US, pp. 125-139; J. Bartik; "IBM's token ring: Have the pieces finally come together?"

National Telecommunications Conference, vol. 1, Dec. 1981, New Orleans, Lo., US. W Bux et al. "A reliable Token-Ring System for Local Area Communication" pp. A2.2.1-A2.2.1.

*Primary Examiner*—Wellington Chin
*Attorney, Agent, or Firm*—A. Sidney Johnston; Barry N. Young; Albert P. Cefalo

[57] ABSTRACT

A ring purging station for a token-ring network is disclosed. The station performs purging operations to remove no-owner frames and frame remnants from the network. The station begins a purging operation by detecting the token on the network and removing it. The station then begins stripping all frame and remnants of frames that it receives from the network, transmits one or more purge marker frames, and sets a purge operation timer to expire after a predetermined period of time. The predetermined period of time is greater than the maximum time required for a frame to propagate around the token ring network when the ring is not malfunctioning. The predetermined period of time may also be less than a valid transmission time period. When the station either detects one of the one or more purge marker frames it transmitted, or when the purge operation timer expires, the station ends the purging operation, and releases the token back onto the ring. The station is also capable of selecting, in cooperation with the other stations, which station is to operate as purging station. The station is further capable of performing duplicate address tests, and will terminate any purging operation upon detection of a duplicate address. In this way no-owner frames and frame fragments are removed from the network, while the ring is otherwise normally operating.

21 Claims, 17 Drawing Sheets

NO-OWNER FRAME AND MULTIPLE TOKEN REMOVAL MECHANISM FOR TOKEN RING NETWORKS

CROSS-REFERENCE TO RELATED APPLICATION

This patent application is a continuation-in-part of U.S. patent application Ser. No. 400,072 filed on Aug. 29, 1989 for "No-Owner Frame and Multiple Token Removal Mechanism for Token Ring Networks", now abandoned.

BACKGROUND OF THE INVENTION

1. Field of the Invention

The invention relates generally to the field of computer networks comprising a plurality of stations which communicate data in a ring using a token-based protocol and more specifically to a mechanism for removing extraneous or erroneous data or ring control information from the network.

2. Description of the Prior Art

A computer network enables various devices, such as processors, mass storage devices, and printers, to communicate with each other over high speed communication links. The devices are connected, that is, coupled, to the network, and thus transfer data to and from the network through stations. The stations are interconnected by the communication links.

One example of such a network is a Local Area Network (LAN). A LAN allows high-bandwidth communication among devices within a limited geographic area. The communication links are typically composed of fiber optics, coaxial cable or twisted conductor pairs.

LAN's may be configured as rings, with network stations transmitting data in one direction around the ring. Thus when a station transmits data onto the ring, the data travels around the ring from station to station, with each station receiving the data from the preceding station and repeating it to the succeeding station, until the data reaches the station that is to receive it. In a well-known ring network the receiving, or destination, station also repeats the data to its downstream successor and the data thus continues around the ring to the originating, or source, station.

The stations operate in accordance with communication protocols which facilitate the orderly transfer of data over the communication links. One type of communication protocol is a token-ring system. Such systems use a token, that is, a specific string of bits, to indicate that a transmitting station has completed its transmission. A succeeding station may then, following the dictates of the protocol, begin transmitting data upon receipt of the token.

In a token-ring system a station may not transmit data over the ring unless it actually holds the token. Thus if a station has data to transmit around the ring, it removes the token from the ring data stream, that is, it "captures" the token, when it receives it from the preceding station. The capturing station then begins its data transmission. When the station is finished with the data transmission it retransmits the token, effectively releasing it. The succeeding stations thereafter transfer the token around the ring until a station captures it in order to make another transmission.

Network stations transmit and receive data in the form of frames. The frames contain, in addition to the data, addresses, an error detection sequence and status flags, for example, a flag indicating receipt of the frame by the intended receiving, or destination, station. The frame addresses identify the source station and destination station or stations.

Every station and every attached device is identified by a unique address. Thus each station has associated with it its unique station-address and the addresses of its attached devices. The stations may have other addresses, for example, logical addresses, associated with them, also. A frame directed from a source station to a single destination station thus contains the address of the source station and, for example, the address of a specific device attached to the destination station. Each station may maintain a list of its associated addresses, such that the station receives the frames containing any one of its addresses.

A destination station, in addition to repeating the frame to its succeeding station, copies the frame for use by the appropriate device(s) associated with the station. The destination station may also set the applicable status flags indicating receipt of the frame.

When the frame has returned to the source station, the station, recognizing the frame as its own, for example, by recognizing the source address in the frame as its own, removes, or strips, the frame from the ring data stream. After a transmission, the first frames received by the source station over the ring are the frames it transmitted, assuming proper operation of the stations on the ring.

Frames may be altered as they travel around the ring. The alteration may affect the source addresses in a number of frames, rendering them unrecognizable to the source stations. The source stations will not then strip the frames, and these frames will travel continuously around the ring. Thus a station listed as a destination station will repeatedly receive and process the frames. The processing will ordinarily detect the duplication, but it does require the use of station resources that might conflict with or delay other operations of the station.

A similar situation occurs when a station which has transmitted frames on to the ring becomes inoperative before it strips the transmitted frames. These frames, like the frames with altered source addresses, continuously travel around the ring because none of the stations then operating on the ring recognize the frames as their own and strip them. Accordingly, these frames, the altered-address frames and any other frames continuously traversing the ring are commonly referred to as "no-owner" frames. No-owner frames needlessly take up ring bandwidth by continuously traveling around the ring. These frames may also cause processing backlogs in the destination stations because the stations must process them each time they receive them. The no-owner frames often require frequent and fast processing because they return to the destination stations in the time it takes the frames to traverse the ring, which is typically faster than frames are ordinarily received. Thus it is desirable to rid the ring of no-owner frames.

A mechanism to purge no-owner frames from rings operating under the IEEE 802.5 standard protocol involves stripping all data from the ring, and then re-initializing the ring. Re-initializing the ring causes it to perform all actions necessary to re-start the ring and make it operational. For example, the initialization includes a claim token operation and the creation of a new token. The claim token operation involves an arbitration process during which the winner of the arbitration, also called the claim token winner, creates the new token. Ring re-initialization may take a considerable period of time and result in lost performance during this period. Thus, for performance considerations, ring re-initializations should be performed as infrequently as possible.

To detect a no-owner frame, that is, to determine when a ring re-initialization is necessary, a station, referred to in the IEEE 802.5 standard protocol as an Active Monitor, places a marker at the beginning of each frame it repeats over the ring. If the Active Monitor thereafter detects a frame containing a marker, indicating that the frame traveled completely around the ring without being stripped, it begins a purge operation which includes a ring re-initialization. The marker is not protected by the frame error detection sequence. Thus an error in the marker may either start a purging operation unnecessarily or prevent one from occurring.

A purge operation begins with the Active Monitor placing a purge frame on the ring and then stripping everything off the ring that it receives. The Active Monitor may transmit multiple purge frames or it may transmit idle frames to fill the ring while it continues stripping everything, including the token, from the ring. When the Active Monitor receives one of its purge frames, indicating that it has essentially filled the ring with the purge and idle frames, it re-initializes the ring and issues a new token. Thus each purge operation causes the loss of all data then on the ring. There is a need for an improved purge mechanism which minimizes the loss of data on the ring and which does not require ring re-initialization and/or ring operation interruption.

The purge operation described above may be used only with ring protocols which allow markers to be placed at the beginning of a frame, for example, the IEEE 802.5 protocol At the present time, protocols such as the ANSI Fiber Distributed Data Interface (FDDI) protocol which do not allow frame markers at the start of frames do not have any mechanism to handle no-owner frames. Thus a purge mechanism which may be used with any token-ring protocol and/or frame format is desirable.

Every time a ring is initialized, a station must be designated as the ring purging station. If the ring is operating according to the IEEE 802.5 protocol the same station, i.e., the Active Monitor, is designated the ring purger after each ring initialization. If the Active Monitor station later fails or is otherwise removed from the ring, the ring must operate without a ring purger until after the ring is initialized. Thus there is a need for an improved mechanism to select a ring purging station. The mechanism should operate after each ring initialization. It should also operate between initializations whenever a previously operating ring purger becomes inoperative.

Token rings may occasionally experience an error condition in which multiple tokens are simultaneously traveling around the ring. This condition may result in multiple stations simultaneously transmitting data onto the ring. If a station which is transmitting receives data frames over the ring, it removes them. Thus data frames transmitted by one station may be removed by a second transmitting station. If the frames are removed before they reach the intended destination, ring operations may be disrupted and data may be lost. Normal operations of the ring may correct the multiple token condition, for example, the second token may be removed by a transmitting station. However, if the multiple token error condition persists, other protocol operations may also be affected, and ring operations may be significantly disrupted. Neither the IEEE 802.5 protocol nor the ANSI FDDI protocol has any mechanism for the detection of a multiple token error condition. Thus the condition will go unchecked until the amount of data which is lost disrupts the operation of the ring enough to cause a ring initialization. Accordingly, there is a need for a mechanism which deterministically detects multiple tokens on the ring.

SUMMARY OF THE INVENTION

One aspect of the invention is a new and improved station and a method for enabling the station to purge the ring of multiple tokens and no-owner frames. Another aspect of the invention comprises various methods for selecting a station to operate as the ring purger. A third aspect of the invention is an improved method to detect and eliminate no-owner restricted tokens.

BRIEF DESCRIPTION OF THE DRAWINGS

FIG. 6 shows the Start procedure and the Candidate Station procedure; FIG. 6A shows the Purger Station procedure; and FIG. 6B shows the Non-Candidate Station procedure.

FIG. 8 shows the Candidate Station procedure; FIG. 8A shows the Purger Station procedure; FIG. 8B shows the Non-Candidate Station procedure; FIG. 8C shows the Failed Purger procedure; and FIG. 8D shows the Start procedure.

DETAILED DESCRIPTION OF AN ILLUSTRATIVE EMBODIMENT

1. Operation of a Conventional Token Ring

Figure 1:
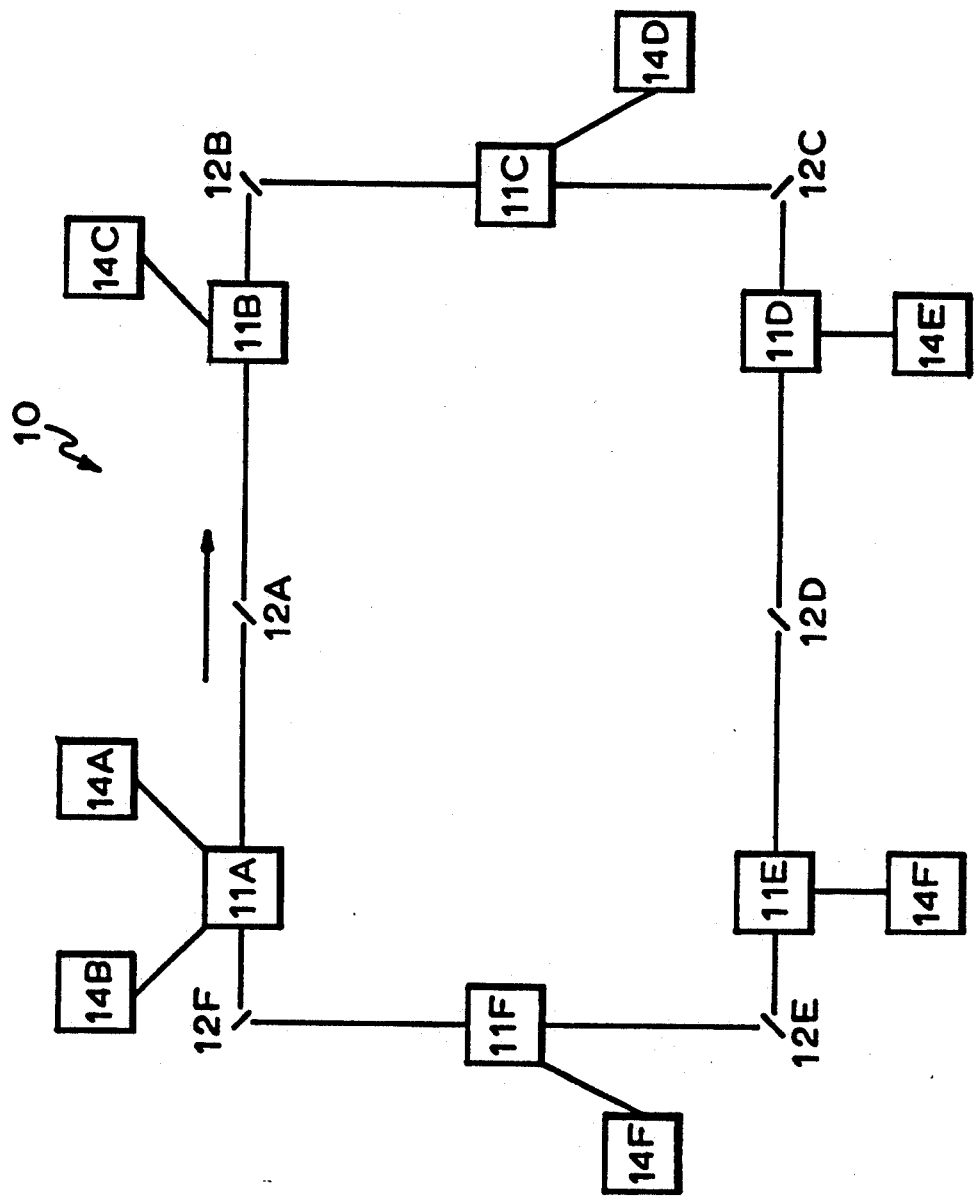
FIG. 1 depicts a functional block diagram of a conventional token ring network.

With reference to FIG. 1, a token ring 10 includes a plurality of stations 11A through 11F connected by communication links 12A through 12F. The stations 11 couple one or more devices 14A through 14F to the ring. The devices 14 may be of diverse types, including data processors, mass storage devices, telecommunications links, printers, and so forth, all of which may transmit information to, or receive information from, other devices in the ring 10 over communication links 12.

Figure 2:
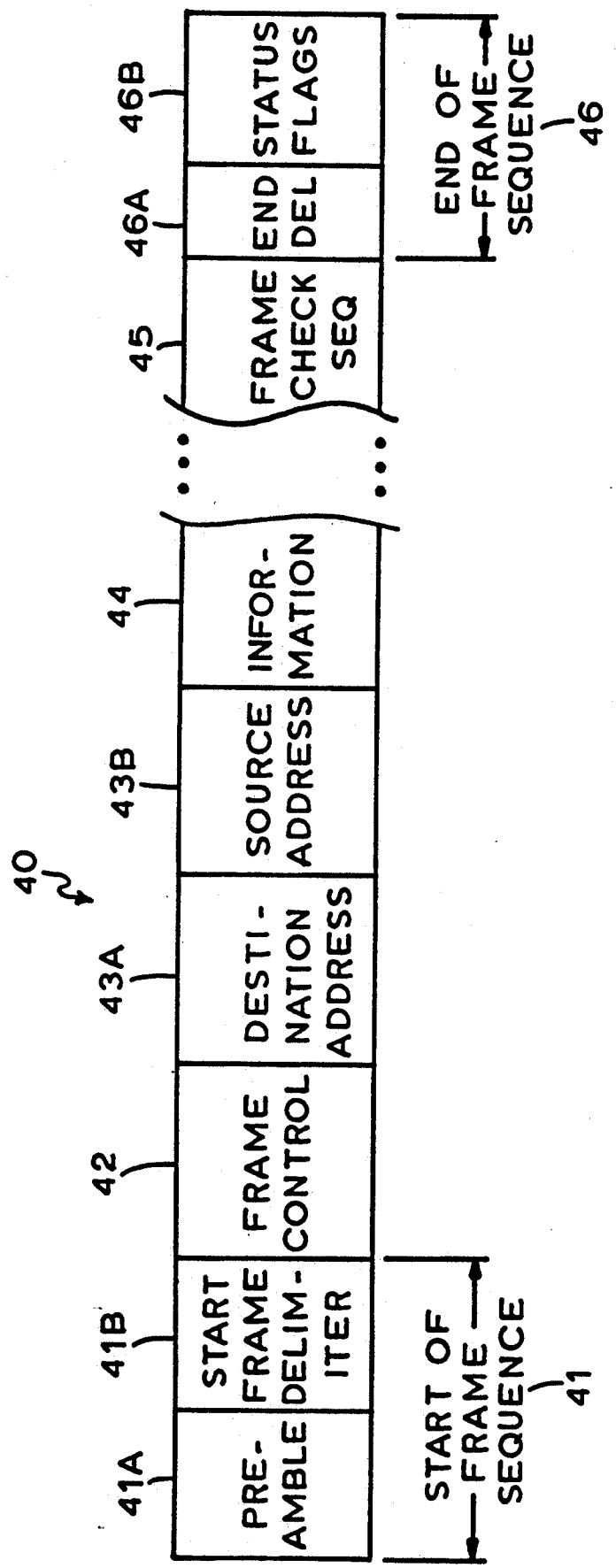
FIG. 2 is an illustration of a conventional information frame used in the network shown in FIG. 1.

The stations 11 transmit information over the communications links 12 in the form of frames, the connection with FIG. 2. Communication between two stations on the ring occurs when, for example, one station 11 (e.g., 11A) transmits a frame to another station 11 (e.g., 11E). To accomplish this, the transmitting station 11A transmits a signal comprising a bit stream forming the frame to another station 11B (following the direction of the arrow) over the communications link 12A interconnecting the two stations. The station 11B that receives a bit stream from the transmitting station 11A repeats the frame over the communications link 12B which interconnects it and another station 11C.

This process is repeated by each of the other stations 11C-F until the frame is returned to the original transmitting station 11A. Essentially, each of the stations receives a signal over a communications link 12 interconnecting it and a preceding station 11, and transmits a signal over another communications link 12 interconnecting it and a succeeding station 11. If a station 11 is an intended recipient of the frame (e.g., 11E) in addition to repeating the frame to its downstream station 11, it also retains a copy of the frame for processing by one or more of the devices 14 connected to it.

The determination of whether a station 11 may transmit a frame to the ring is based on whether the station holds a token. A token is a special sequence of bits which the stations transmit around the ring to indicate the end of a previous transmission. If station 11 needs to send a frame, when the token reaches it, it does not repeat the token, thereby capturing the token and becoming its holder. The station 11 then transmits one or more frames. After completing the transmission of the frame(s), the station 11 resumes transmission of the token around the ring in accordance with the ring protocol. Other stations on the ring may then capture the token and transmit frames.

When a station 11 receives a frame which it originated, other than the token, it strips the frame from the ring 10. Thus a frame is transmitted around the ring, that is, repeated from station to station, only once. If the originating station does not strip one of its frames, the frame will continue to circulate around the ring. This causes the intended destination station to receive the frame over and over again. The time required for such a frame to circulate around the ring is generally much shorter than the average rate at which new frames arrive at a destination station. Thus the destination station receives this circulating frame at a faster rate than it ordinarily receives frames, and it must process these frames more quickly, also. This results in additional station processing overhead and possibly, station errors.

As noted above, information is transferred in the form of frames, the structure of which is shown in FIG. 2. With reference to FIG. 2, a frame 40 is divided into several fields. The start of a frame is denoted by a preamble field 41A and a start frame delimiter field 41B which further denotes the beginning of the portion of the frame containing the frame information. These fields are generally referred to as a start-of-frame-sequence 41.

Immediately following the start of frame sequence 41 is a frame control field 42 detailing whether the bit stream is a token or a frame and, if it is a frame, what type of frame it is. The possible types of frames include, for example, data frames (frames used to send a message from one station to another), claim token frames, beacon frames, purge marker frames, and void frames. The next two fields are address fields 43A-B, namely, a destination address field DA 43A whose contents identify the intended recipient(s) of the frame and a source address field SA 43B whose contents identify the source station. The information field 44 follows the address field 43, and is in turn followed by a frame check sequence field 45 containing an error detection sequence used by the receiving stations to detect errors in any of the frame control field 42, the address fields 43 and the information field 44.

The end of the frame is denoted by an end-of-frame sequence 46. The sequence 46 includes an end delimiter field 46A, which defines the end of a frame, and a frame status flag field 46B containing a set of status flags. The status flags are conditioned by stations other than the source station to provide status information to the source station. This information may include, for example, whether the frame was copied by the intended destination station(s), whether any errors have been detected, etc.

If a station 11 recognizes the contents of the frame destination address field 43A as one of its own addresses, that is, either its station-address or one of its other associated addresses, it copies the frame for processing by its attached device(s) 14. It also repeats the frame to the next station in the ring as set forth above.

When a frame returns to its source station, the station recognizes the contents of the frame source address field 43B as its own address, and strips (removes) the rest of the frame from the ring. When a frame is thus stripped, the start-of-frame sequence 41, the frame control field 42 and part of the address fields 43 remain. These fragments are ignored by the stations on the ring because they do not form a complete frame. They are stripped from the ring when they encounter a station in the act of transmitting or a purging station.

If the source address field 43B is altered as the frame travels around the ring, the source station may not recognize the frame as one of its own. Thus the source station will not strip it. The frame then travels around the ring, as a no-owner frame, requiring duplicative processing by the stations listed as destination stations. Similarly, if a source station becomes inoperative after transmitting frames, the frames are not recognized by any operating stations and thus the frames are not stripped. These frames also travel around the ring as no-owner frames requiring duplicative processing. To avoid such duplicative processing, a ring purging mechanism is utilized.

2. Purging Using Purge Marker Frames Without Sequence Numbers

The ring purging operation of the present invention is performed by one or more stations which are elected as ring purging stations after the ring is initialized. Preferably, only one station is elected as a purging station at any given time, as will be described below with reference to FIGS. 5 and 6.

While a station is functioning as a purging station, it is said to be in the "purge mode on" state. Otherwise, it is in the "purge mode off" state. Equivalently, the station's purge mode is said to be "on" or "off", respectively. A station performs the purging process described below in section 2 or 3 only while is in the "purge node on" state.

For this invention, a purging station performs purging operations only during normal operation of the ring, that is, only when there is a token on the ring and the ring is not undergoing an initialization. The stations respond only to error-free frames, that is, frames whose frame check sequences indicate that the contents of the frame have not been altered during transmission over the ring.

As described in Sections 5 and 6, below, stations participating in purging and purger station selection operations transmit and receive purger hello frames. These frames include in the destination address field a group address, as defined in ANSI FDDI. Thus the stations in the group, that is, the stations participating in the purging and elections operations, may all receive the purger hello frames. The particular group address used in the purger hello frames is a pre-determined group address assigned to such frames by a ring implementor.

The purging stations discussed below transmit, receive, and strip frames and tokens using conventional circuitry. Each station performs these tasks following the operating protocol of the ring. For example, a station on a ring following the ANSI FDDI protocol includes circuitry to transmit, receive and strip frames and tokens according to the ANSI FDDI Token Ring Media Access Control (MAC) Specification ANSI X3.139-1987. During a purge operation, the stations may perform conventional stripping operations and strip received frames after examining the frame source address or they may strip all information from the ring as discussed below.

Figure 3:
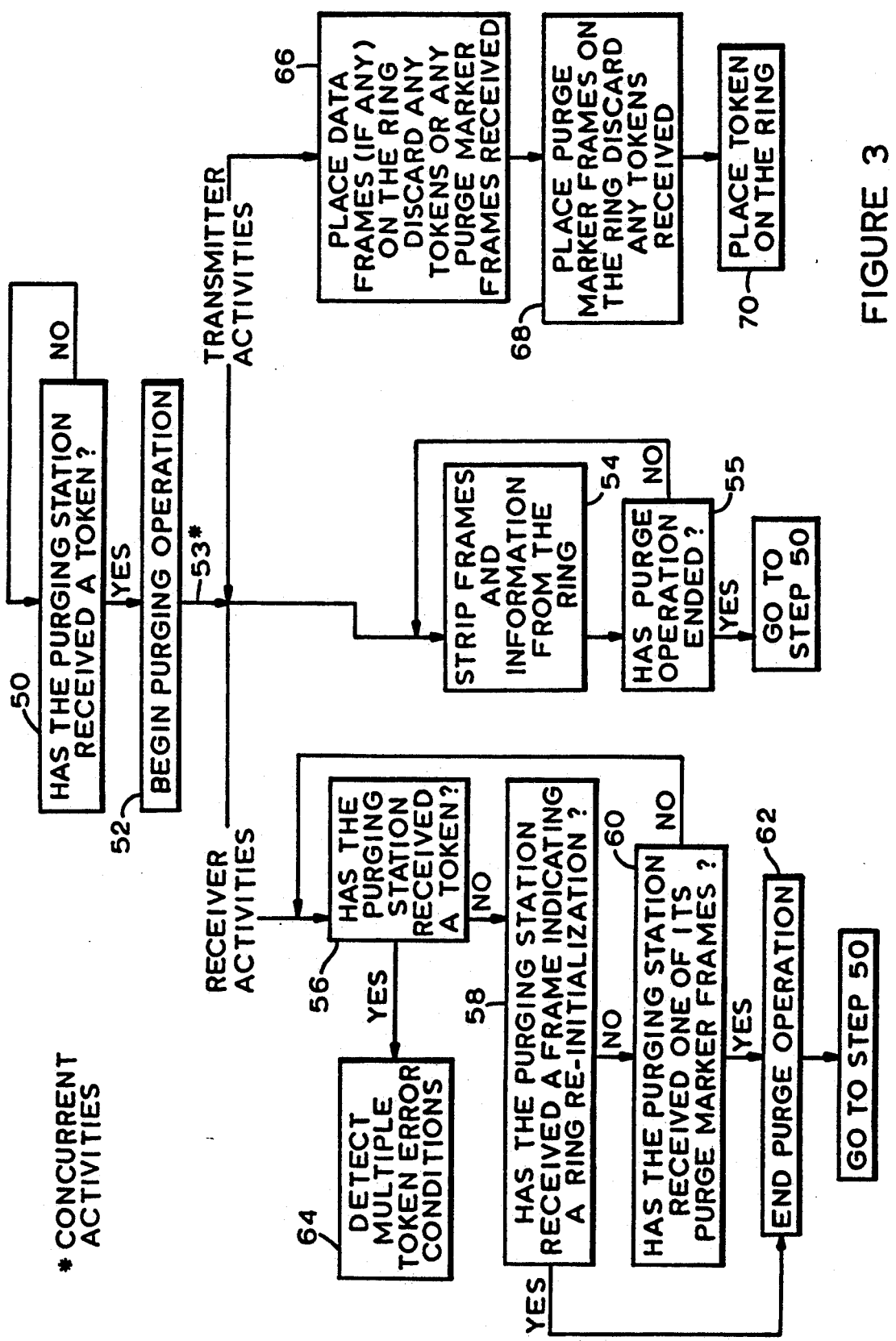
FIG. 3 is a flow chart depicting the operation of stations functioning as purging stations and multiple token detecting/correcting stations in accordance with a first embodiment of the invention that does not use sequence numbers in the purge marker frames.

FIG. 3 is a flow chart of the purging operation of a station operating in accordance with a first embodiment of the invention. This embodiment does not employ sequence numbers in the purge marker frames.

A purging station begins a purge operation when it receives a token (steps 50-52). Thus it begins stripping from the ring frames and other information it receives (step 54). At the same time, the station transmits in order: (i) any data frames it has to transmit, (ii) one or more of its purge marker frames as discussed in more detail below, and (iii) the token (steps 66-70). As indicated by arrow 53, the purging station concurrently performs transmitting (steps 66-70), stripping (steps 54-55), and receiving (steps 56-64) operations. The station does not differentiate between various types of tokens or prioritized tokens which may be present on the ring, and thus, it begins a purging operation whenever it receives any token.

The station continues its purge operation until it receives one of its purge marker frames (steps 60-62), or until it receives a token (steps 58 and 64) or a frame indicating a ring initialization (step 58), either of which indicated the ring is operating abnormally. As will be described below, the receipt of a purge marker frame indicates to the purging station where in the ring data stream it began purging and thus where it should stop purging.

A purge marker frame contains information identifying it as a purge marker frame, for example, a specific frame-type code in the frame control field 42 (FIG. 2), as well as information which identifies the purging station, for example, the station address number in its source address field 43B (FIG. 2). The purge marker frame preferably contains an error detection sequence, also. Including the error detection sequence in the frame ensures that the station does not mistake a purge marker frame from another station as one of its own due to an error in the frame and also to reduce the probability that the station incorrectly interprets other frames as purge marker frames due to errors. Redundant purge marker frames are typically transmitted to avoid compromising a purge operation due to errors in a single purge marker frame. Preferably, the purging station transmits two purge marker frames.

Referring again to FIG. 3, while the purge operation is continuing, the purging station strips from the ring everything it receives (steps 54-55). It may leave on the ring purge marker frames containing the address of another station, as discussed below.

Following the ANSI FDDI standard protocol, a prior art station which is operating normally repeats all frames received from the ring except frames which it originally transmitted. Thus, it repeats the starting delimiter field 41B, frame control field 42, destination address field 43A and source address field 43B (FIG. 2) of all frames, and if the source address field 43B contains the station's address it strips the remainder of the frame instead of repeating it.

Similarly, a station according to the present invention which is performing a purge operation using a first possible implementation of stripping step 54 may repeat the portions of received frames up to the source address field 43B and strip the rest of the frame as described above. This enables the purging station to selectively strip or not strip purge marker frames containing the address of another station.

Using a preferred second alternative implementation of stripping step 54, the station performing a purge operation strips from the ring every received frame in its entirety, that is, the station strips the frame beginning at the starting delimiter field 41B and ending at the end of the status flag field 46B. Thus the purging station removes remnants of frames that other stations do not remove, as well as the purge marker frames from other stations.

During a purging operation, the station should, assuming normal operation of the ring, receive first over the ring the frames it transmitted. All other frames should have been stripped by their source stations. Thus when a purging station, before receiving one of its purge marker frames and ending the purge operation, strips everything from the ring (except possibly purge marker frames belonging to another station) it rids the network of extraneous data and/or erroneous frames, such as no-owner frames.

During a purge operation, a purging station may also receive frames destined for it. Thus it strips these frames and forwards them to attached devices for further processing.

As discussed above, the purging station ends the purging operation when it receives any of the following: (i) one of its own purge marker frames which an included error detection sequence indicates is error-free, (ii) the token, or (iii) a frame indicating a ring initialization (such as, in the ANSI FDDI protocol, a claim token frame or a beacon frame) (steps 56-62). When the purging station ends a purge operation (step 62), it begins operating as a normal, non-purging station. Thus it forwards, or repeats, received frames to its downstream station. As part of its normal operation, the station does not forward, but instead strips from the ring, the frames it originally transmitted (that is, frames containing its address in the source address field 43B (FIG. 2)). Accordingly, when a purging station ends its purge operation after receiving a first purge marker frame, it continues to strip from the ring any redundant purge marker frames.

As explained earlier, at the beginning of the purge operation the purging station transmits a number (possibly zero) of data frames, followed by one or more purge marker frames, followed by a token (steps 66-70). Other stations on the ring which have data to transmit thereafter capture the token, transmit their data, and finally release (i.e., transmit) the token. These data frames from other stations are received by the purging station following the last of its purge marker frames. Thus the station, which is operating as a normal station after receipt of its purge marker frames, forwards these data frames so that they can propagate completely around the ring. These data frames thus pass all stations on the ring, including the destination station, and then return to the source station. Proper forwarding of such data frames by the purging station is ensured because the purging station terminates its purging operation as soon as it receives a purge marker frame (step 60). When the purging station next receives a token, which indicates the end of a previous transmission, it begins a new purge operation (Steps 50-52).

Under error free operation, the purging station should receive its purge marker frames before it receives a token simply because it transmitted its purge marker frames before it transmitted the token. If the station receives a token before it receives one of its purge marker frames (step 56), this token must have preceded the token captured by the station before it transmitted the purge marker frames. Therefore, the station detects a multiple token error condition (step 64). Multiple token detection activities are discussed in more detail in Section 4 below.

If the purging station receives a second token while it is still holding a token, the station strips the second token from the ring and continues its purge operation (step 68). By stripping this second token, the purging station may correct an existing multiple token condition, and thus, the purging station does not count this situation as a detected multiple token error condition. The receipt of a second token ends a purge operation and counts as a multiple token error condition only if the token is received after the release of the first token and before the receipt of a purge marker frame.

Similarly, if the purging station receives one of its purge marker frames before it transmits any purge marker frames in the current purge operation, it strips the received purge marker frames and continues its purge operation. However, if the purging station has already transmitted at least one of its purge marker frames during the current purge operation and it is still holding the token when it receives one of its purge marker frames, it ends its current purge operation. It does not count this as a multiple token error condition.

3. Purging Using Purge Marker Frames with Sequence Numbers

In the preferred embodiment of the purge operation discussed below with reference to FIG. 4, the purge marker frames contain, in addition to the station address and the error detection sequence as in the first embodiment, a purger operation sequence number associated with the particular purge operation. The purge operation sequence number begins at a pre-determined value and is incremented each time the purging station begins a new purge operation (steps 52 and 65). All of the purge marker frames transmitted as part of a purge operation contain the same sequence number. When the purge operation sequence number reaches its maximum value it is re-started, that is, wrapped around to the beginning value. A preferred sequence number is a one-bit number, thus, it alternates between "0" and "1" to indicate the then current purge operation.

Figure 4:
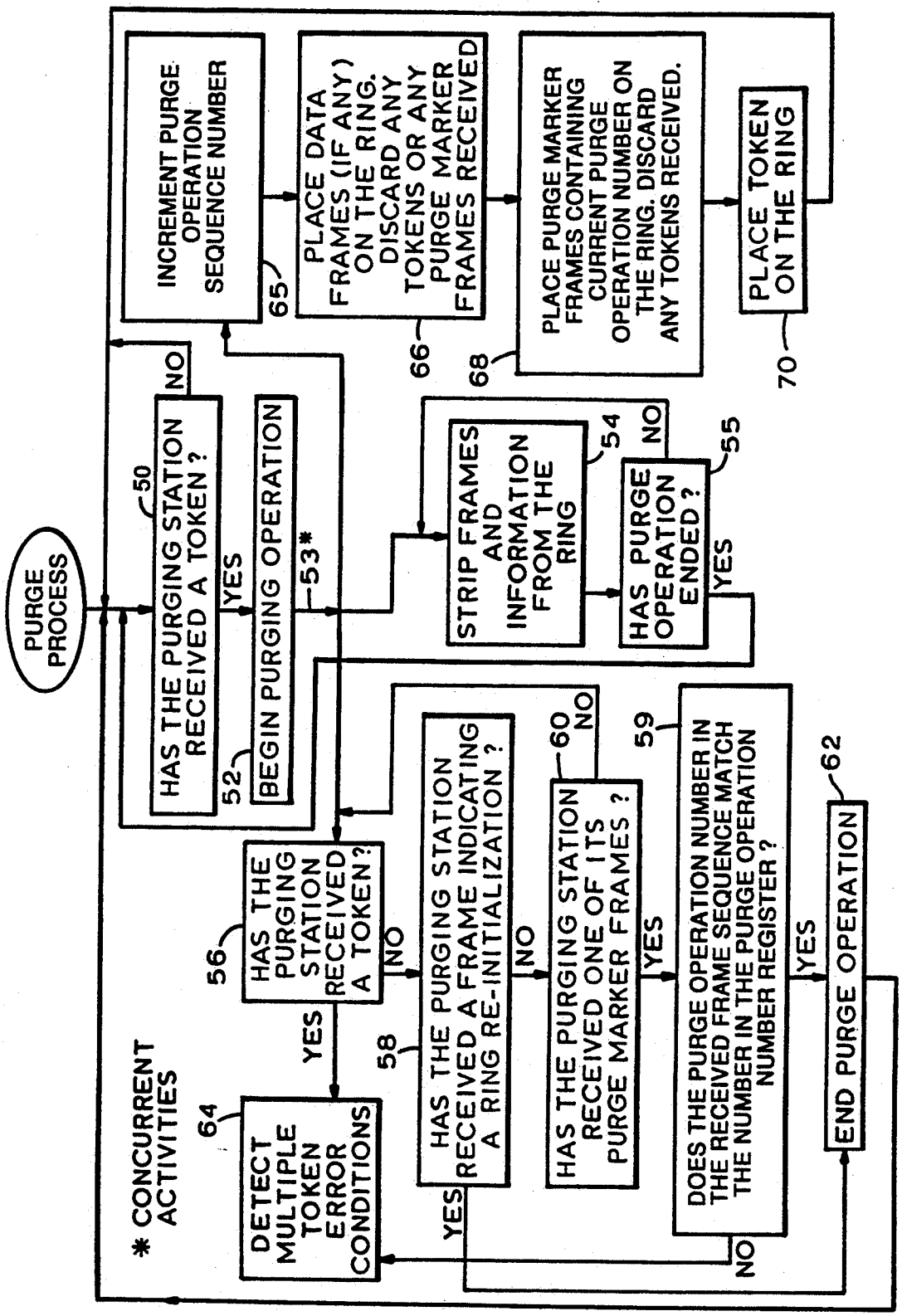
FIG. 4 is a flow chart depicting the operation of stations functioning as purging stations and multiple token detecting/correcting stations in accordance with the preferred embodiment that uses sequence numbers in the purge marker frames.

Comparing the purge operation of the first embodiment shown in FIG. 3 with the preferred embodiment of the purge operation shown in FIG. 4, it can be seen that the preferred purge operation includes all the steps of the first embodiment and adds two additional steps 59 and 65. As described above with reference to FIG. 3, the purging station concurrently performs transmitting, stripping and receiving operations as indicated by arrow 53.

Referring now to FIG. 4, when the purging station receives a token it starts a new purge operation (steps 50-52). The station first increments its purge operation sequence number, and then stores the new sequence number in a "sequence number" register for future reference (step 65). Next, the station places on the ring: (i) any data frames it has ready to transmit, (ii) one or more purge marker frames containing the new sequence number, and (iii) the token (steps 66-70). Meanwhile, as the station is incrementing its purge operation sequence number and transmitting its various frames, it is also stripping from the ring everything it receives (step 54). If the station receives a second token while it is still holding the token, the station discards the second token and continues its purge operation without interruption (step 66). Thus the station does not increment its sequence number.

The station continues its purge operation (i.e., the purge mode remains "on") until it receives (i) one of its own purge marker frames (ii) a token, or (iii) a frame indicating a ring re-initialization (steps 56-62). If a purging station receives a token before it receives one of its purge marker frames (step 56), or if it receives one or more purge marker frames which contain the wrong purge operation sequence number (step 59), the station detects a multiple token error condition (step 64). Multiple token error condition detection activities are discussed in more detail in Section 4 below.

When the purging station receives one of its purge marker frames, it compares the purge operation sequence number in the received purge marker frame with the stored sequence number (steps 60 & 59). If the sequence numbers match, it indicates that the ring is operating properly and the station simply ends its purge operation (steps 59 & 62). If the sequence numbers do not match it indicates that multiple tokens may be on the ring, and the station detects a multiple token error condition (steps 59, 64).

4. Multiple Token Error Condition Detection Activities

As set forth above, a purging station detects a multiple token condition if it receives a token before a purge marker frame. Also, if the station includes a sequence number in the purge marker frame, it detects a multiple token error condition if it receives one or more purge marker frames which contain the wrong sequence number.

Once the station detects a multiple token error condition (step 64) it does one of three things, depending on the protocol implementation of this invention. It either (1) continues its purging operation until it receives its own purge marker frame, (2) immediately re-initializes the ring, or, preferably, (3) ends its current purge operation and increments a multiple token error condition count "Purge Error Count".

If the ring protocol follows option (3), the purging station causes a ring initialization to correct the multiple token error condition only after it detects the condition a pre-determined number of times. The protocol implementation of this invention may force a ring initialization if the error condition is detected a pre-determined number of times ("Purge Error Limit") within a given period of time, or it may require consecutive detection of the condition a predetermined number of times before a ring initialization is performed.

Using the preferred option (3), the ring is allowed to correct the multiple token error condition through normal operations before the activities on the ring are disrupted by a ring initialization. Also, requiring that the condition be detected a number of times ensures that the station does not start multiple token correction procedures when another error condition is causing the sporadic altering or removing of the purge marker frames.

On a ring which does not use sequence numbers in the purge marker frames, i.e., a ring following the purge operation of the first embodiment, the only way in which a purging station can detect a multiple token error condition is by receiving a token before receiving a purge marker frame. If the station follows option (3), it increments its error condition count on receipt of the token. If the count is below the number required for a ring initialization, the station then refrains from starting another purge operation for a predetermined period of time (measured by a "Purge Wait" timer) which is long enough to ensure that a token has traversed the ring at least twice, or until it twice receives the token. In the preferred embodiment, the predetermined period of the Purge Wait timer is 50 milliseconds, which is 25 times the required value, because a shorter timer happens to be less convenient to implement.

The station refrains from purging to allow any purge marker frames on the ring to traverse the ring and return to their source station. The purging station operating as a normal station recognizes its source address in the frames and removes them. After two token rotations the purging station should have stripped the ring of all purge marker frames. If the station did not refrain from starting a new purge operation, it would place purge marker frames before each token it received. Eventually, all the tokens would become associated with purge marker frames and the error condition would become undetectable.

If the ring uses sequence numbers, the station need not refrain from starting a purge operation when its error count is below the number required for a ring initialization. Each time the station begins a purge operation it increments the sequence number. If multiple tokens are on the ring the station transmits purge marker frames with a first sequence number upon receipt of a first token and later transmits purge marker frames with a second number upon receipt of a second token. When the first purge marker frames return to the station, the station detects an error because the frame sequence numbers do not match the number associated with the current (second) purge operation. Upon receipt of the token, the station again increments the sequence number and begins a new purge operation. The station next receives the purge marker frames associated with the second token. Again, the frame sequence numbers do not match the number of the then current operation, and thus, the station detects another error condition. If multiple tokens remain on the ring, the sequence numbers in the received purge marker frames will not match the numbers of the current purge operations and the station will detect the error condition a sufficient number of times to cause a ring initialization.

Placing sequence numbers in the purge marker frames allows a station to detect reliably a multiple token error condition. Further, it allows a station to determine whether or not the ring, through normal operations, has corrected the condition. The inclusion of a sequence number in the purge marker frame does not require complicated circuitry; it requires only that the station maintain, in storage, a number associated with the then-current purge operation.

If the ring uses the first mechanism, that is the mechanism without sequence numbers in the marker frames, the station must have a Purge Wait timer to time the periods during which the station refrains from starting a purge operation after the detection of a multiple token error condition (if the station is operating under the preferred option 3 discussed above). A station operating under one of the current standard network protocols, for example, ANSI FDDI or IEEE 802.5 standard protocols, monitors the time it takes a token to traverse the ring. The stations set timers which last for the standard maximum token rotation time. Thus the station could easily maintain a Purge Wait timer which lasts twice the maximum rotation time to accommodate the purge operation. The ease with which the purge mechanism is implemented must be balanced against the possibility of no-owner frames circulating around the ring during the period in which the station refrains from performing a purge operation. Thus, the ring implementor must weigh the consequences of using the more complex purge operation including sequence numbers against the consequence of having no-owner frames circulating around the ring for a limited period of time in choosing the purge method for the ring.

5. Selection of a Purging Station Using Purger Hello Frames

Figure 5:
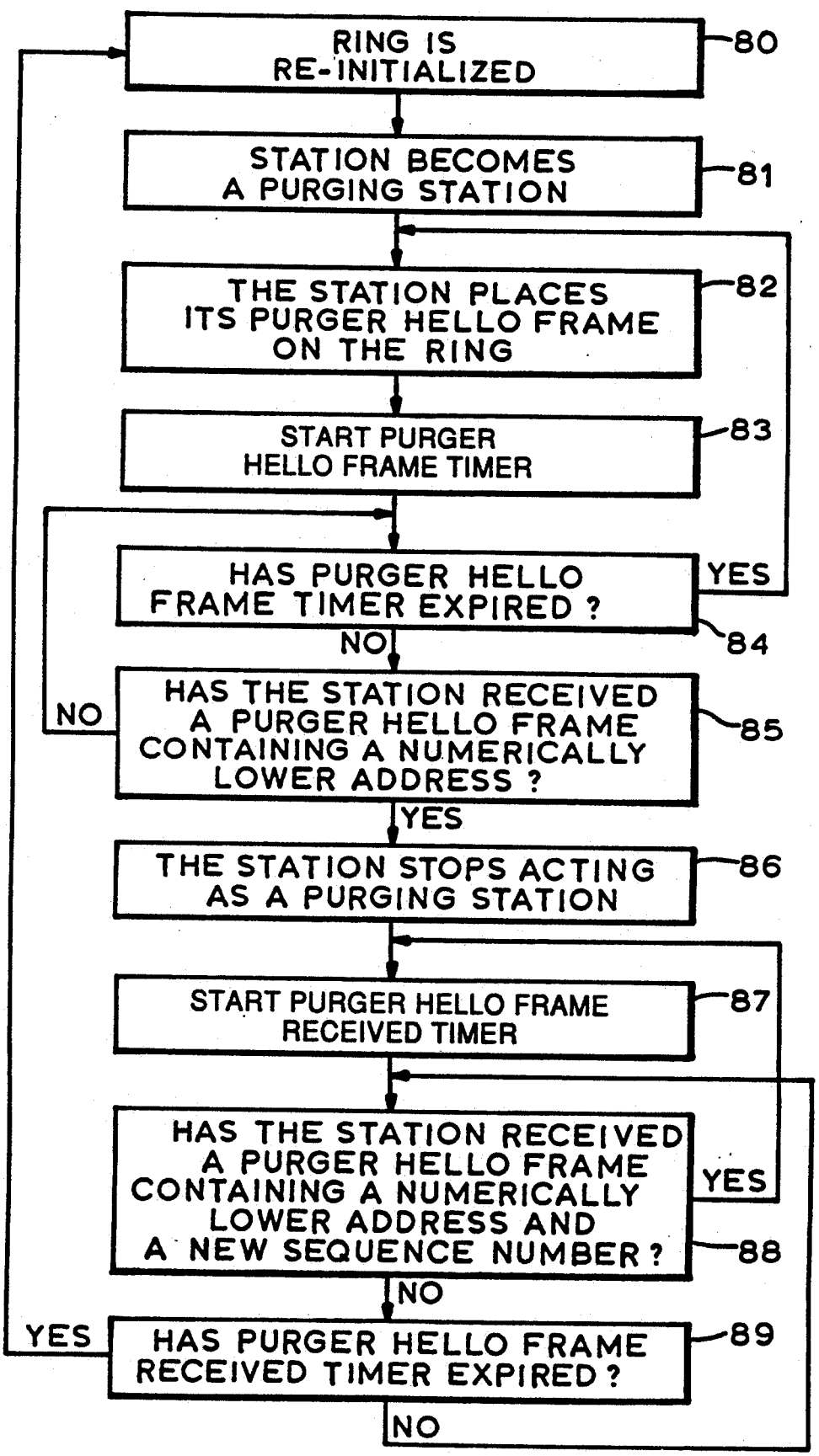
FIG. 5 is a flow chart illustrating a first method of selecting a purging station using purger hello frames.

A purging station must be selected after each ring initialization. With reference to FIG. 5, using a first method of selecting a purging station, after the ring is initialized each properly functioning station on the ring operates initially as a purging station and places on the ring a "purger hello" frame, that is, a frame containing the station address as the source address and a code identifying it as a purger hello frame (steps 81-82). Each of these stations above then acts as a purging station in accordance with Section 2 or 3 above, until it receives a purger hello frame containing a source address which is numerically smaller than its own address (steps 85-86). When a station transmits a purger hello frame, it also starts a purger hello frame timer (step 83). When the timer expires, the station transmits another purger hello frame (step 84). If the station at any time receives a purger hello frame containing an address which is smaller than its own, it stops operating as a purging station and disables its purger hello frame timer (steps 85-86). Eventually, there is only one station operating as a purging station, which is the station with the lowest address.

The preferred length of a purger hello frame timer for a 100 megabit FDDI ring is ten seconds, plus or minus two seconds. Thus the maximum length of this purger hello frame timer is twelve seconds.

When a station becomes a non-purging station, it starts a purger hello frame received timer to time the receipt of the next purger hello frame containing a numerically smaller address (step 87). Each time a non-purging station receives such a frame it restarts the timer (steps 88 & 87). If the purger hello frame received timer expires before such a purger hello frame is received (step 89), the non-purging station again becomes a purging station (steps 80-81). The station thereafter periodically transmits its purger hello frames and performs purging operations (as described in Section 2 or 3, above) until it receives a purger hello frame containing a numerically smaller address. Thus even if the selected purging station becomes inoperative the maximum time a ring is without a purging station is less than two cycles of the purger hello frame received timer.

The preferred length of time for the purger hello frame received timer on a 100 megabit FDDI ring is three to six times the maximum length of the purger hello frame timer. In the preferred embodiment, the purger hello frame received timer has a period of 36 seconds, and the maximum time that the ring is without a purging station is 72 seconds (two timer periods). The exact time periods of the purger hello frame and the purger hello frame received timers are not critical. However, the ratio of the periods of the two timers is important. A non-purging station should wait three to six times the maximum time allowed for a purging station to transmit a purger hello frame. This prevents a non-purging station from unnecessarily becoming a purging station. Thus, it promotes the operation of the ring with a single purger station.

The purger hello frames preferably contain sequence numbers. Thus, before a purging station transmits a purger hello frame, it increments its purger hello frame sequence number and then incorporates the new number in the purger hello frame. When a non-purging station receives the purger hello frame it compares the sequence number with the number that was in the previous purger hello frame. If the numbers differ, the station restarts its purger hello frame received timer as described above. Conversely, if the sequence numbers are the same, the station ignores the purger hello frame and does not restart its timer. Accordingly, if the ring purging station becomes inoperative and therefore becomes unable to strip its previously transmitted purger hello frame (for example, if the station is removed from the ring), the non-purging stations will not continue to restart their timers based on the receipt of the old purger hello frame, that is, the frame which contains the same sequence number.

When a non-purging station becomes a purging station due to the expiration of its purger hello frame received timer (step 89), it must strip from the ring any remaining purger hello frames transmitted by the previous purging station. These frames are no-owner frames because the previous purging station is inoperative. The purging station may accomplish this either by causing a ring initialization as indicated in FIG. 5 (step 80), or by ensuring that it performs at least one purge operation before it again becomes a non-purging station due to the receipt of a purger hello frame containing a smaller station address.

Instead of selecting the station with the numerically lowest address as the purging station, the ring protocol may select as the purging station the station with the highest station address. The selection method is essentially the same, except that timers are re-set only for purger hello frames which contain larger addresses. Each station on a ring must follow the same method of selecting a purging station.

6. Purger Station Selection Using Candidate Hello Frames

Figure 6:
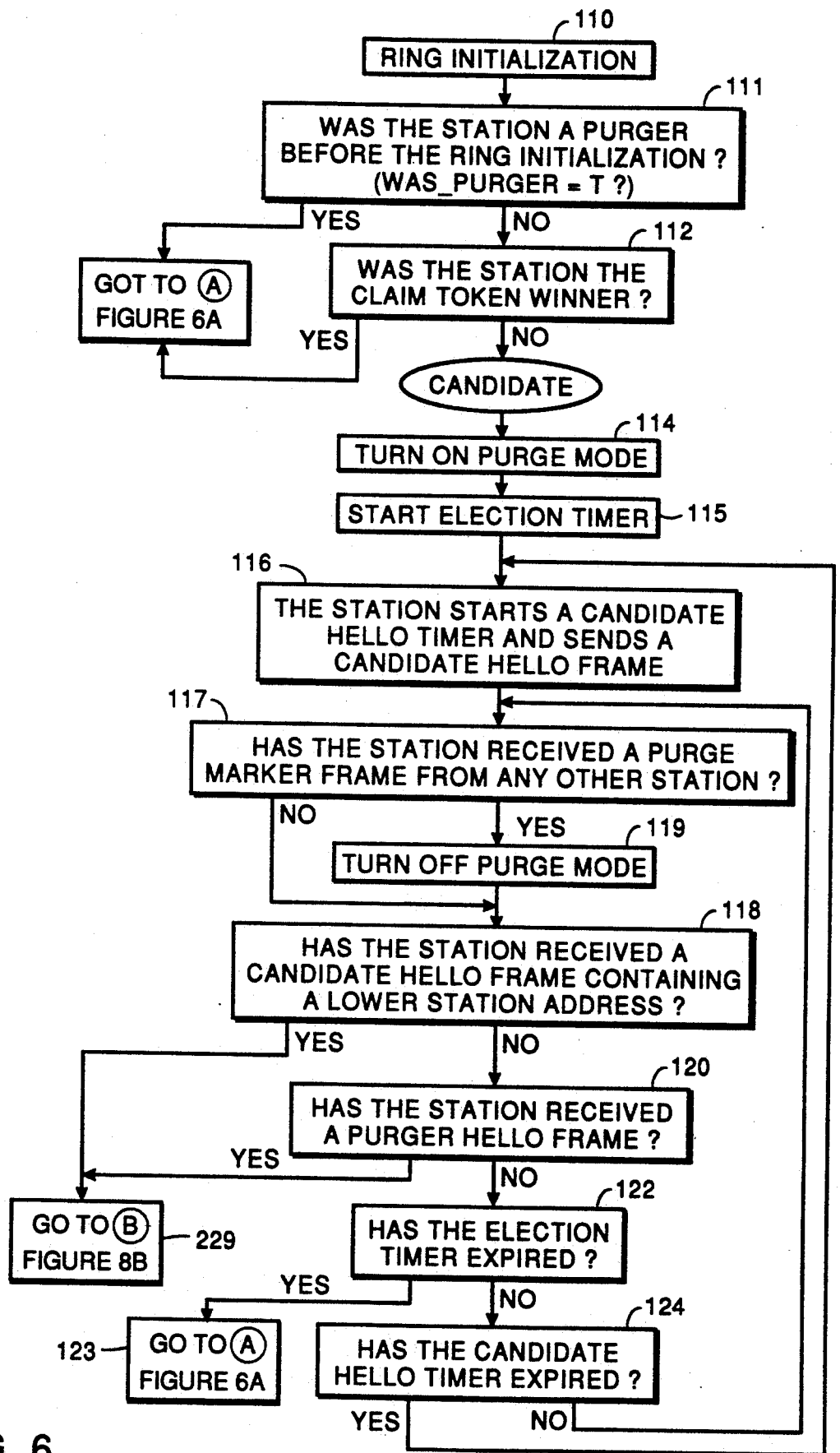
FIGS. 6, 6A and 6B together constitute a flow chart illustrating a second, preferred method of selecting a purging station using candidate hello frames. More specifically.

A purging station may be selected using a second, preferred purger station election procedure shown in FIGS. 6-6C. After the ring is initialized (step 110), each station enters the "Start" or "Restart" Procedure (step 100) in FIG. 6. If the station which was operating as the ring purger before the initialization is still operative, its WAS_PURGER flag will be "TRUE" to indicate that it was the last purger, and it will continue to act as the ring purging station during the election (step 111). In addition, the station which wins the right to issue the token—that is, the station that wins the claim token operation in accordance with the ANSI standard FDDI ring protocol—acts as a ring purger during the election (step 112). Therefore, there may be two purger stations on the ring immediately after a ring initialization.

Figure 6A:
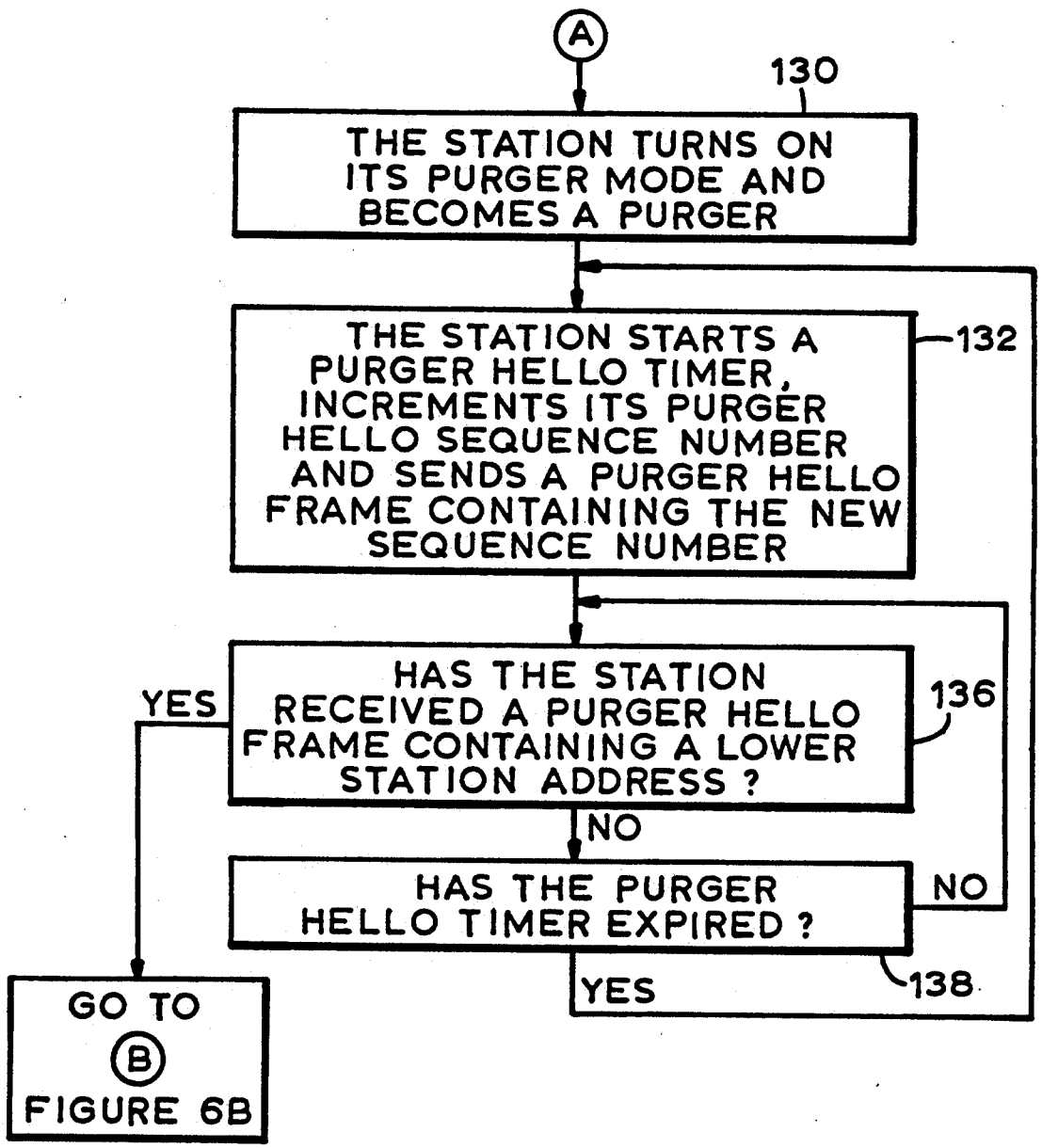

A station acting as the ring purger at the start of the selection procedure enters the Purger Station Procedure shown in FIG. 6A. Upon first entering the Purger Procedure, the station turns on its purge mode (step 130) and begins a purging operation in accordance with Section 2 or 3 above. The station transmits a purger hello frame containing the sequence number (step 132). It also starts a purger hello frame timer to time the release of a next purger hello frame (step 132). The station continues to operate as the ring purger in accordance with Section 2 or 3, above, until it receives a purger hello frame containing a numerically smaller station address (step 136). Only a purger station (i.e., a station may transmit purger hello frames.

The other stations on the ring act initially as candidate stations (step 114). Candidate stations periodically transmit "candidate hello" frames rather than "purger hello" frames. Referring again to FIG. 6, each candidate station initially turns on its purge mode (step 114) and starts a purging operation in accordance with Section 2 or 3, above. The station also starts an election timer which establishes the maximum time that the station will remain a candidate (step 114).

Each candidate station next issues a "candidate hello" frame which contains the station address and a frame-type code indicating that it is a candidate hello frame (step 116). Finally, each station starts a candidate hello frame timer to determine when to issue a next candidate hello frame (step 116). If the station, at any time, receives a candidate hello frame which contains a smaller address (step 118), it becomes a non-candidate station as discussed in more detail below with reference to FIG. 6B. If the station is still a candidate when the candidate hello timer expires, and the election is still underway, the station issues another candidate hello frame and restarts the candidate hello timer (step 124). If a station is still a candidate when its election timer expires, it essentially declares itself the ring purging station by exiting the Candidate Station Procedure and starting the Purger Station Procedure (step 122). The station will then issue purger hello frames in accordance with the Purger Station Procedure (FIG. 6A).

In the 100 megabit per second FDDI ring of the preferred embodiment, the preferred period for the purger hello frame timer is 3–5 seconds, and the preferred period for the candidate hello frame timer is 8–12 seconds.

A candidate station may either be in purging mode or non-purging mode. When a station first becomes a candidate, it turns on its purging mode and becomes a "purging candidate" station (step 114).

While the station is a candidate purging station, it performs purging operations in accordance with Section 2 or 3, above, but it does not issue purger hello frames. When a candidate purging station receives a purge marker frame from another station, it turns off its purge mode (i.e., it stops its purging operations) and thus becomes a non-purging candidate station (steps 117, 119). Thereafter the station continues to participate in the election by issuing candidate hello frames (steps 118-124).

Figure 6B:
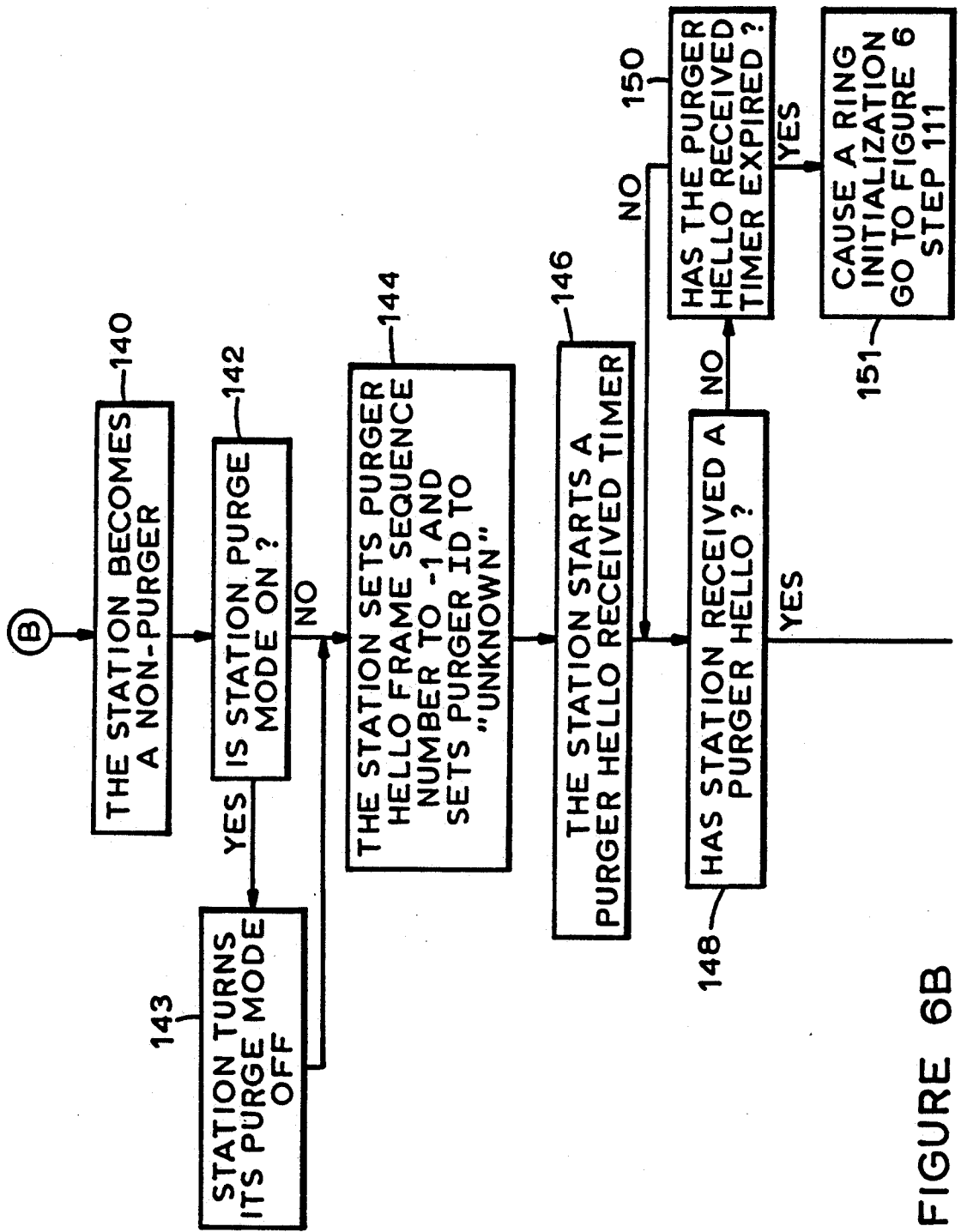
Figure 6B:
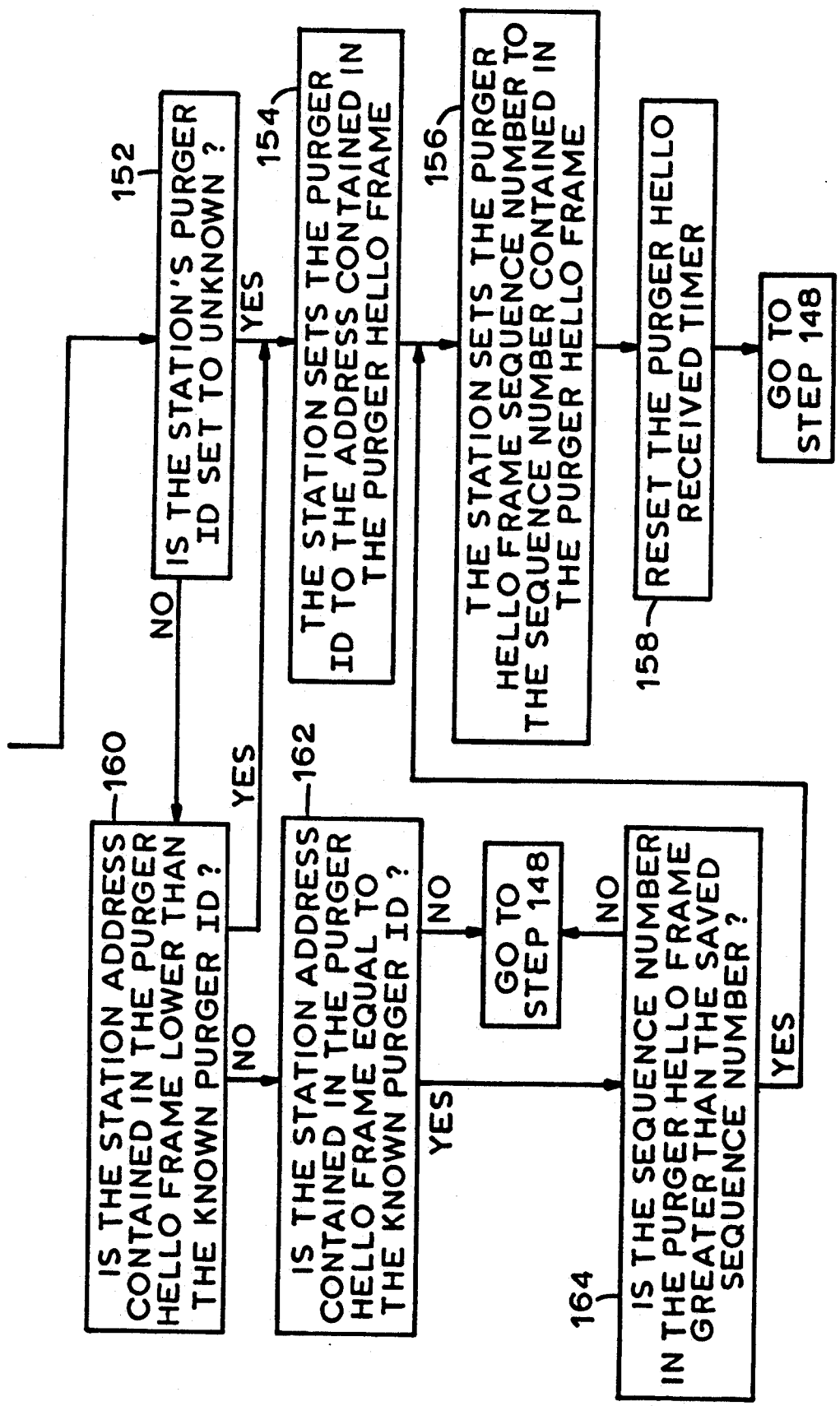

Referring now to FIG. 6B, when a candidate purging station receives a purger hello frame it becomes a non-candidate non-purging station (step 140). The station thus turns off its purge mode (if it is still on), and sets a purger hello frame sequence number register to negative 1 and a purger id register to a condition representing "unknown" (steps 142-144).

The station then starts a purger hello frame received timer (step 146) and waits for the receipt of another purger hello frame. If the station does not receive another purger hello frame before the purger hello frame received timer expires, the station begins a new purger station selection operation and becomes a purging candidate-station (steps 148-151). The preferred value for the purger hello received timer is 3-6 times the period of the candidate hello timer. In the preferred embodiment, the period of the hello received timer is 30 seconds. The new purging candidate-station must remove from the ring purger hello frames belonging to the previous purging stations. It may accomplish this by causing a ring initialization (FIG. 6B, step 151) before it becomes a candidate station (FIG. 6, step 114).

When a non-purging station which has its purger id register set to "unknown" receives a purger hello frame it sets its purger sequence number register and its purger id register, respectively, to the sequence number and the source address contained in the purger hello frame (steps 152-154). It then restarts its purger hello frame received timer (step 158). When the station next receives a purger hello frame it compares the address in the received frame with the stored purger address. If the address in the received frame is numerically smaller than the stored address the station re-sets the purger id register to the source address contained in the frame (steps 160, 154). The station then re-sets its purger sequence number register to the purger hello sequence number contained in the purger hello frame and restarts the purger hello frame received timer (steps 156-158).

If the non-purging station receives a purger hello frame containing the same source address as the purger id, it re-sets its purger hello frame received timer only if it receives a new purger hello frame, that is, a purger hello frame with a new (higher) sequence number (steps 160-164). If the address in the received purger hello frame is equal to the address in the purger id register, the station compares the sequence number of the frame with the sequence number stored in the purger hello frame sequence number register (steps 162-164). If the sequence number in the received purger hello frame is larger than the stored sequence number, indicating that the received purger hello frame is a "new" one, the station re-sets its sequence number register to the frame sequence number. The station then restarts its purger hello frame received timer (steps 158).

If the sequence number in the received frame in the received purger hello frame is equal to or smaller than the stored sequence number, indicating that the purger hello frame is not a new one, the station ignores it and does not restart its purger hello received timer (steps 162-164). Similarly, the station ignores purger hello frames containing source addresses which are larger than the stored purger address (step 160). Accordingly, if a station operating as the ring purging station becomes inoperative and it therefore does not remove its purger hello frames from the ring, the non-purging stations will not continue to restart their timers based on the receipt of the old purger hello frame, that is, a frame with the same sequence number. If the purger hello received timer expires, the station starts a new election process by initializing the ring (step 151).

To summarize this preferred purging station selection procedure, the candidate stations perform purging operations until they receive a purge marker frame from other stations. The candidate stations, whether or not they are performing purging operations, continue to participate in the purging station election procedure as set forth above. Thus they continue to monitor the receipt of candidate and purger hello frames to determine when to become non-purging candidate stations or non-candidate (non-purging) stations, respectively. Thus, at any given time during the election, except initially, there is at most one station acting as a purging station.

The length of an election, that is, the length of the election timer, is three to six times the maximum length of the candidate hello frame timer. Thus the election may last for as long as 60 seconds.

In an alternative embodiment of this selection procedure, the candidate stations do not perform purge operations. In this alternative embodiment, steps 114, 117 and 119 are deleted from the Candidate Station Procedure shown in FIG. 6. The election proceeds as set forth above, except that the ring may be operating for a time without a purging station. For example, if the station previously operating as the ring purger is inoperative and/or the station winning the claim token operation is incapable of operating as a purging station, all the stations are operating as candidates, and therefore, none of them is purging. The selection procedure is relatively short, however, and thus, the operations of the ring will not be significantly affected during the short time without an active purger.

The time during which the station may be operating without an active purger is the maximum timer period for an election, i.e., 60 seconds.

The current purging selection procedure ensures that a purging station is operational within a relatively short time after a ring initialization or a purging station failure. It further ensures that only one station operates as a purging station.

The purging mechanism which has stations operating as candidates is the preferred method because there is typically just one station operating as a ring purger station at any given time. However, in order for a station to operate as a candidate, it must maintain a candidate hello frame timer. Also, an additional election timer is required. The election mechanism which uses only purger hello frames is simple; however, it degrades performance due to having more than one station operating as a purging station at a given time. The ring implementor must weigh the advantages and disadvantages of each method for the particular ring and must choose between them when selecting a purger selection mechanism.

The purging station selection operation, using either of the procedures described above, ensures that at least one purging station is operating on the ring. There may be a short interval during which no purger is operational, either due to a purger failure or a ring re-initialization. This is acceptable because the existence of a purger is not necessary for correct operation of the ring, it is only essential for providing good performance on the ring in the presence of no-owner frames. For example, during this short interval no-owner frames may result in duplicate processing at destination stations. The invention attempts to minimize the interval during which there is no purger on the ring.

Each of the inventive mechanisms for selecting a purger may result in multiple purgers operating on the ring simultaneously for a short period of time. This results in some performance degradation because the multiple purgers use bandwidth on the ring to transmit their purge marker frames. It is preferable to have only a single purger operational at all times. Thus the inventive mechanisms operate quickly to ensure that only one of the multiple purging stations remains operational.

7. Additional Enhancements to Purger Election Algorithm

Figure 7:
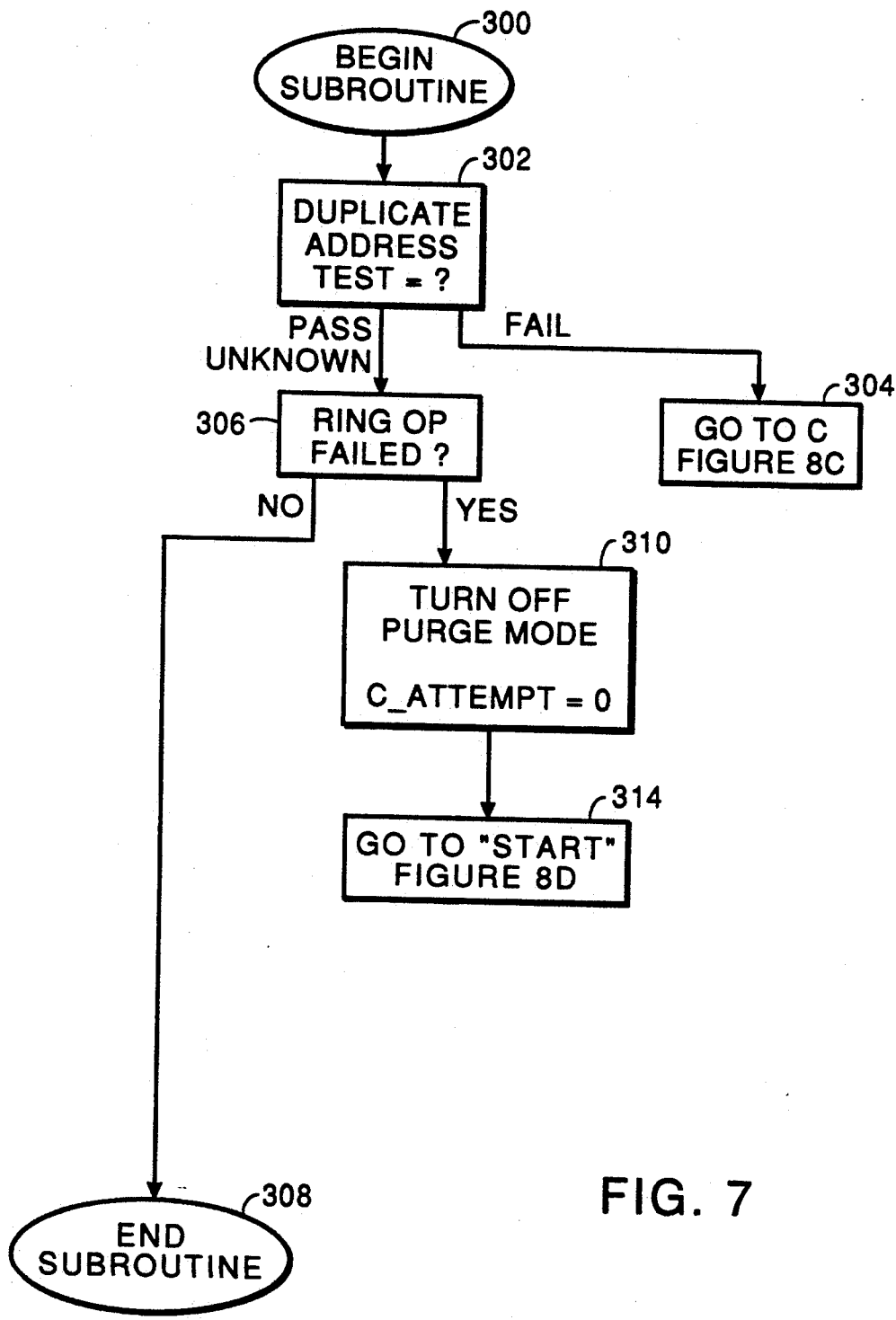
FIG. 7 is a flow chart of a Failure Detection Subroutine improvement to the method of selecting a purger station using candidate hello frames.
Figure 8:
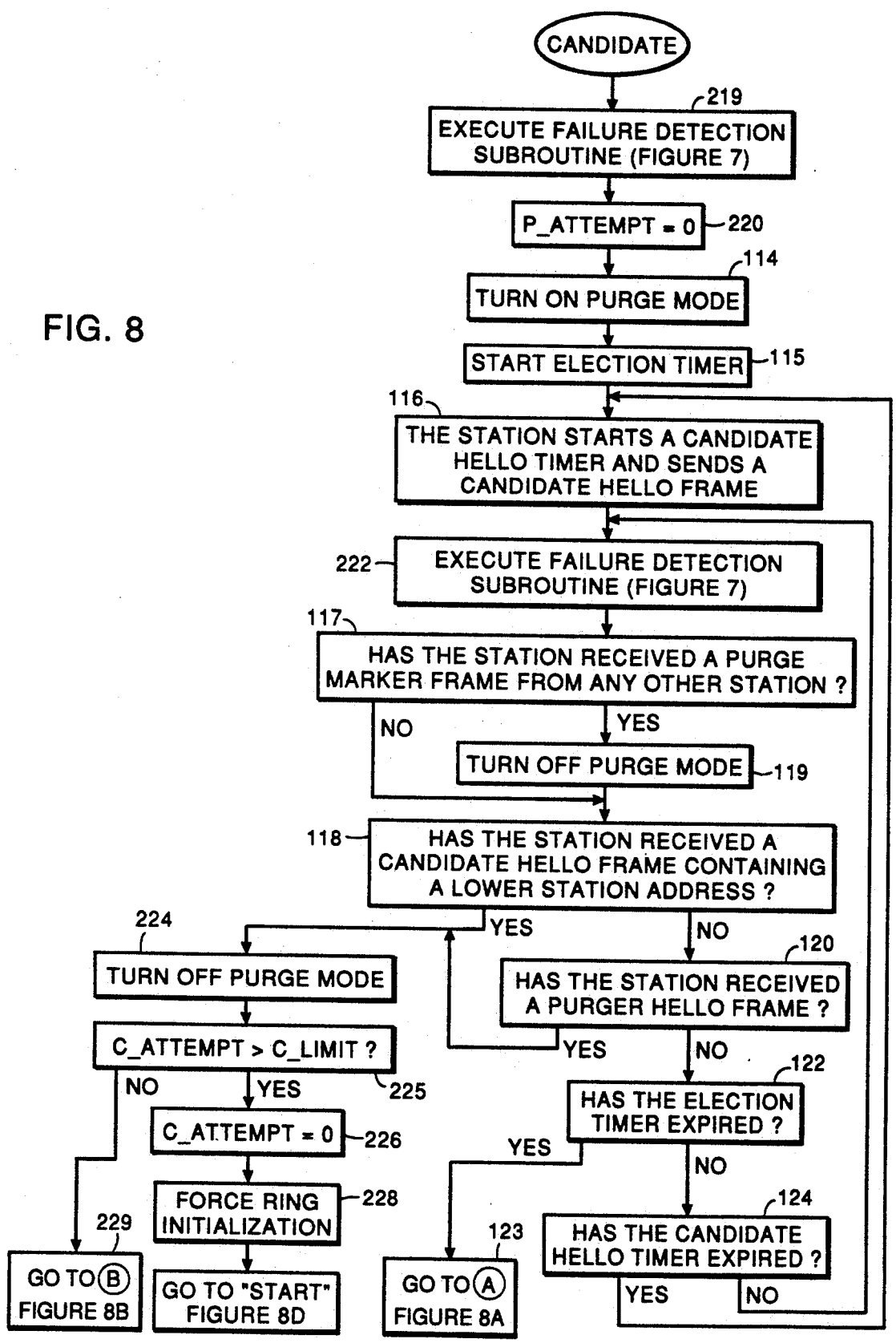
FIG. 8, 8A, 8B, 8C and 8D together constitute a flow chart of a further improved version of the method shown in FIGS. 6-6B. More specifically.

Sections 8-11, below, describe additional enhancements to the purger election algorithm, described in Section 6 and in FIGS. 6-6B, which uses candidate hello frames. The currently preferred embodiment of the invention includes all these enhancements. FIGS. 7 and 8-8D show this preferred embodiment.

The enhancements also may be adapted to an alternative embodiment of the invention which is intermediate in complexity between the embodiments shown in FIGS. 5 and 6-6B, respectively. Specifically, such an intermediate embodiment could omit the use of candidate hello frames which are used in the FIG. 6-6B embodiment, but could retain the use of a non-candidate state as shown in FIG. 6B in which a station is precluded from becoming a purger until it ceases to receive any new purger hello frames.

8. Avoiding Ring Initializations Caused by Failure to Receive Purger Hello

According to the embodiment of the invention described in Section 6 and FIGS. 6-6B, a station which is a "non-candidate" (i.e., which is in the state shown in FIG. 6B) will cause a ring initialization (step 151) if the station fails to receive a purger hello frame during the period of the "purger hello received" timer (steps 148-150). The original rationale for initializing the ring was that the absence of any purger hello frames was presumed to be caused by a serious failure or error condition in the ring. However, this presumption was overly broad.

In particular, the foregoing algorithm can unnecessarily result in too many ring initializations, which would undesireably interrupt communication during the period of each initialization operation. An individual station may fail to receive a purger hello frame for reasons that may not indicate a serious ring failure. For example, that station's input buffer may be full, so that purger hello frames received by the station while the buffer is full will be ignored. As another example, the station which most recently acted as the purger may have become inoperative. In this case, a new purger station could be elected without any need to re-initialize the ring.

The way the preferred enhancement to the invention dramatically reduces the number of unnecessary ring initializations is by causing a non-candidate station to become a candidate station without initializing the ring in response to a failure to receive a purger hello frame during the period of the "purger hello received" timer. However, if the station alternates between candidate and non-candidate states more than a predetermined number (named "C_LIMIT") of times without ever winning a purger election, a serious error condition is presumed to exist in the ring, and the station then forces a ring initialization.

The implementation of this enhancement is shown in FIGS. 8-8D. Step 151 of FIG. 6B is replaced by steps 250 and 252 of FIG. 8B. Specifically, when a non-candidate station fails to receive a purger hello frame during the "purger hello received" timer period (steps 148-150), a counter called C_ATTEMPT is incremented (step 250), and the station becomes a candidate station (steps 252 and 220).

In comparison with FIG. 6, the Candidate Station Procedure shown in FIG. 8 includes new steps 224, 225, 226, 228, and 229 (as well as new steps 219, 220 and 222 which will be explained later). When the candidate station receives any purger hello frame or a candidate hello frame with an address lower than the station's own address (steps 118 and 120), the station turns off its purger mode (step 224) as it would have in the embodiment previously described in Section 6 and FIGS. 6 and 6B. In the enhanced embodiment shown in FIG. 8, the station then compares the value of the C_ATTEMPT counter with the predetermined value C_LIMIT (step 225). The preferred value of C_LIMIT is 5. If C_ATTEMPT has not yet exceeded the predetermined limit, the station then becomes a non-candidate again (step 229). However, if C_ATTEMPT has exceeded the limit, the station resets the C_ATTEMPT counter to zero (step 226) and then forces a ring initialization (step 228). Finally, the station returns to "Start" (FIG. 8D, step 100) and waits for the ring initialization to complete (step 101) before becoming either a purger or a candidate again.

Figure 8A:
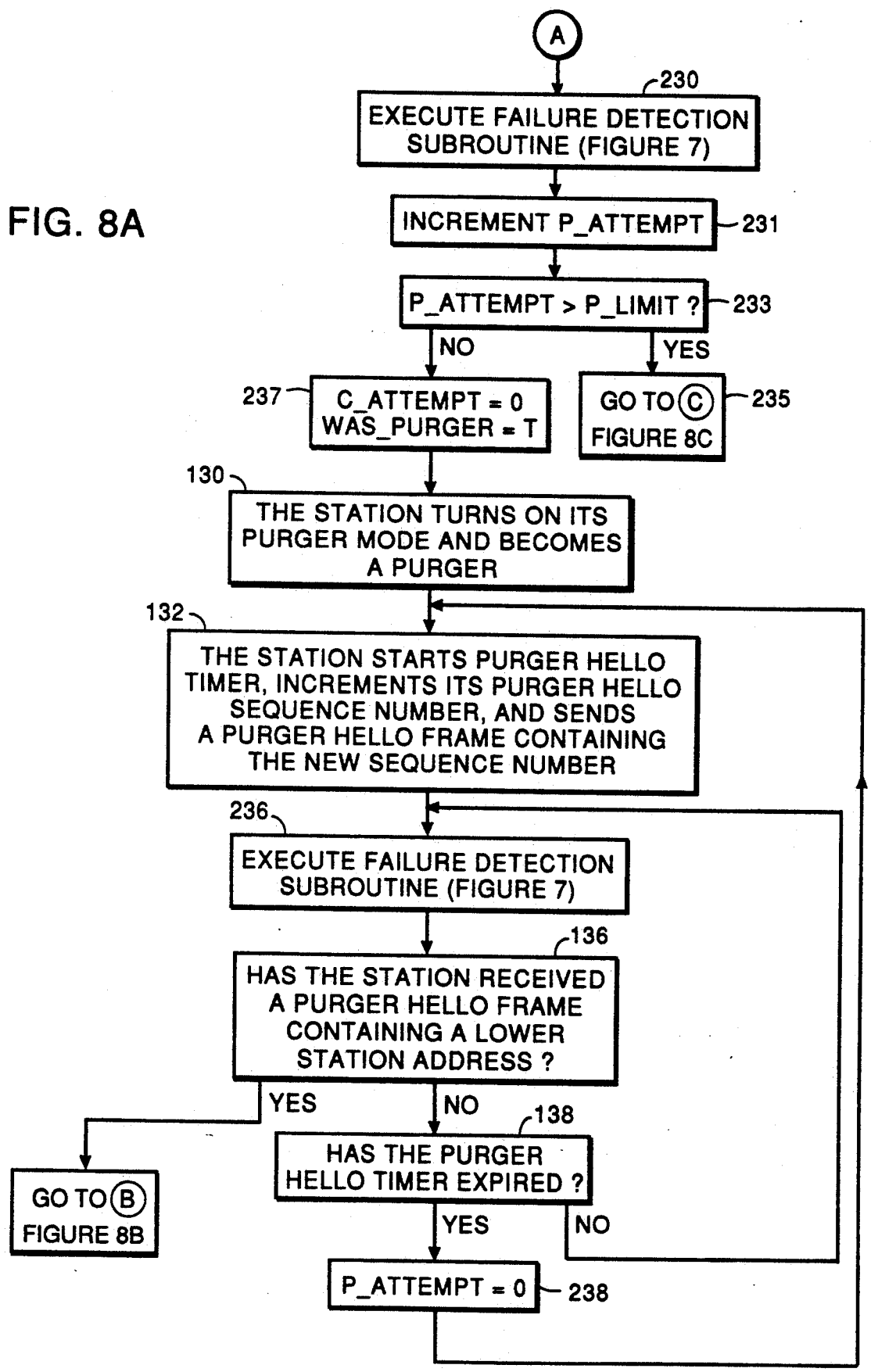
Figure 8B:
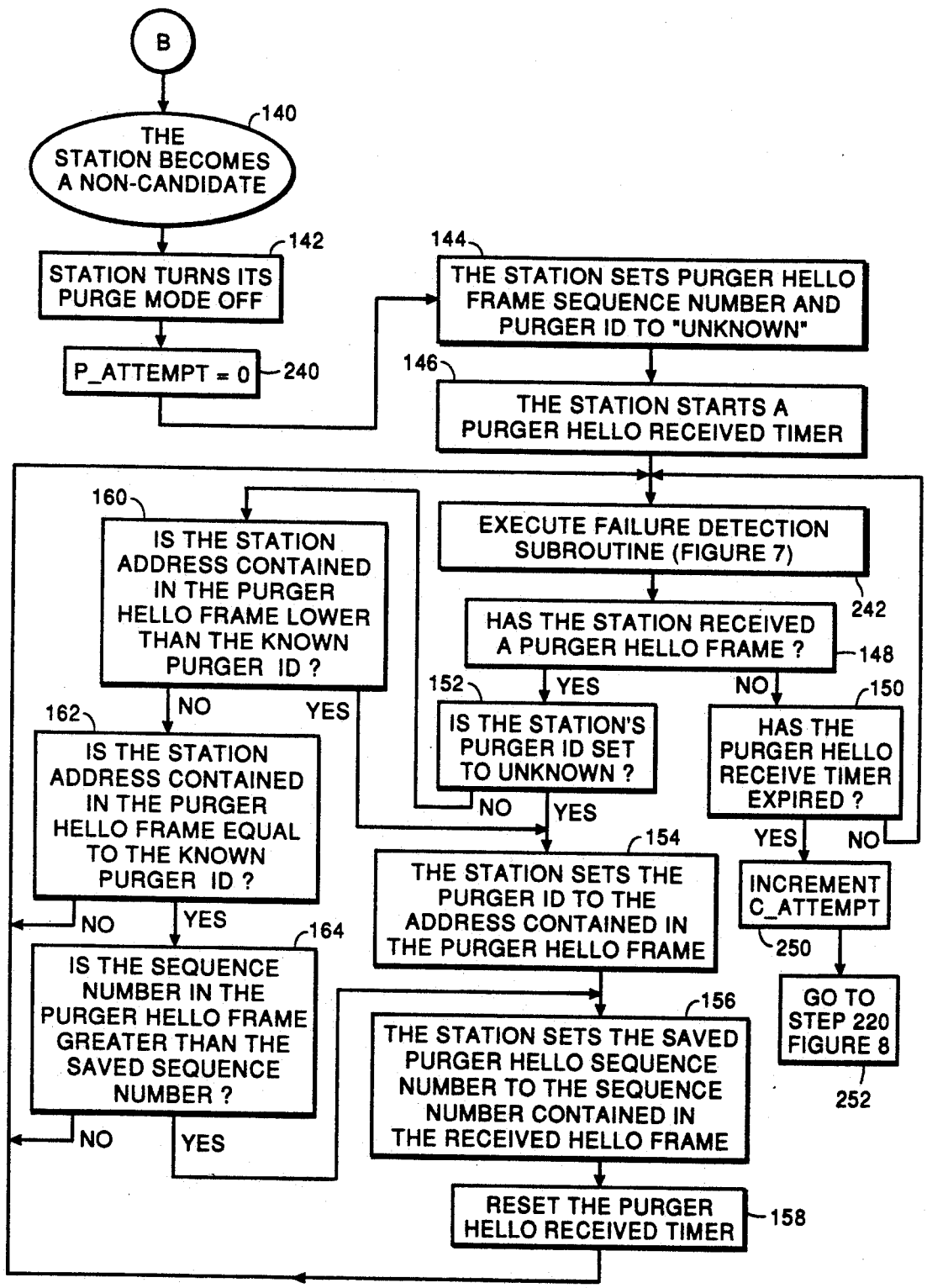

If the station wins a purger election and becomes a purger (steps 118, 120, 122, 123 in FIG. 8; point "A" in FIG. 8A), then the station resets C_ATTEMPT to zero (step 237 in FIG. 8A).

If the Failed Purger Procedure enhancement described in Section 9, below, has been implemented, then C_ATTEMPT also must be reset to zero whenever the station stops being a purger because of a failure detected by the Failed Purger Procedure. This is implemented in step 202 in FIG. 8C and in step 310 in FIG. 7.

9. Failed Purger Procedure

Error conditions in the ring that specifically involve the individual station operating as the purger can cause repeated ring initializations without the error condition being corrected. For example, if the purger station has the same address as a second station, the second station will strip all the purger station's frames, so that the purger station will never receive those frames and hence will never reach the end of a purging operation. Because the purger station continuously strips all frames it receives, the ring soon will contain nothing but idle frames. Eventually, this will cause a station to force a ring initialization after that station's TVX (transmission valid) timer times out, in accordance with the conventional ANSI FDDI token ring protocol. After the ring is initialized, the same station will become a purger again, and the duplicate address problem will again cause another ring initialization. Such ring initializations could repeat indefinitely.

Figure 8C:
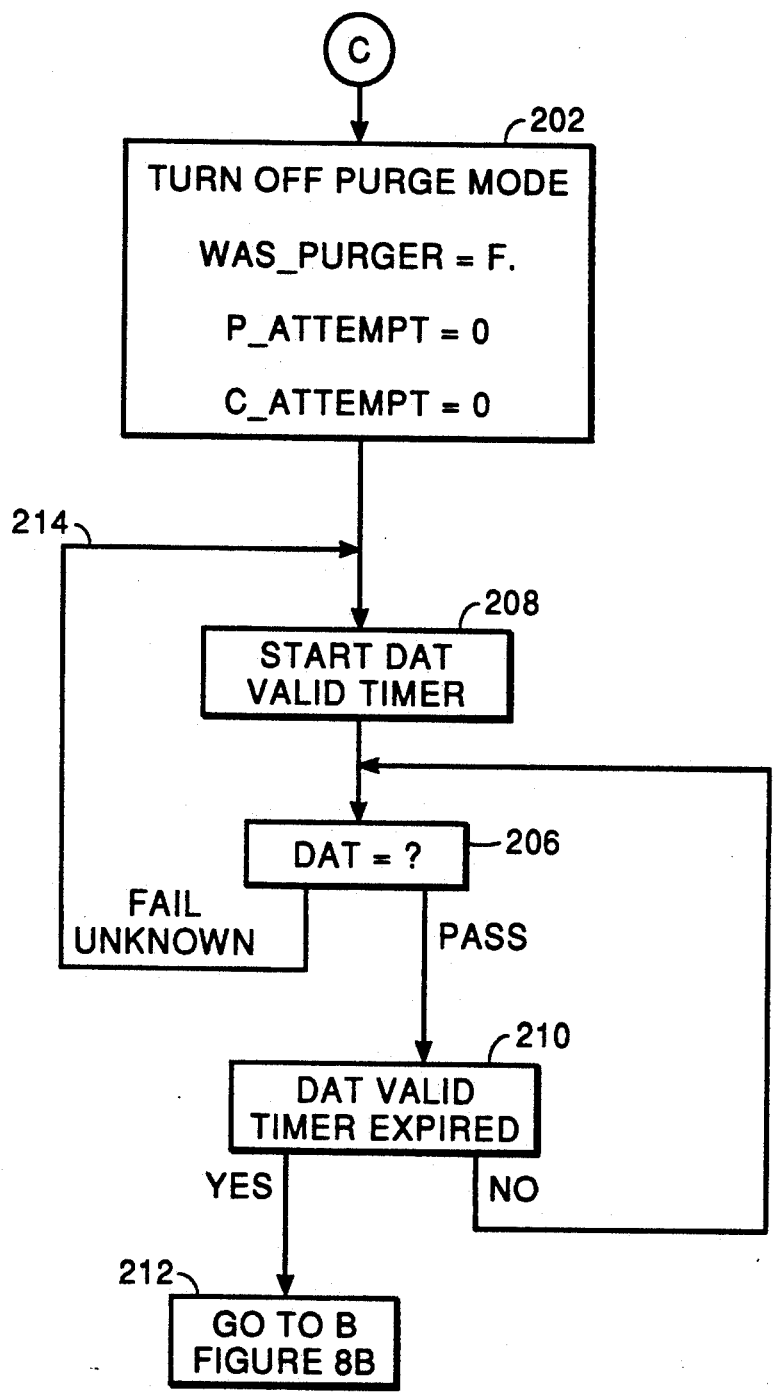
Figure 8D:
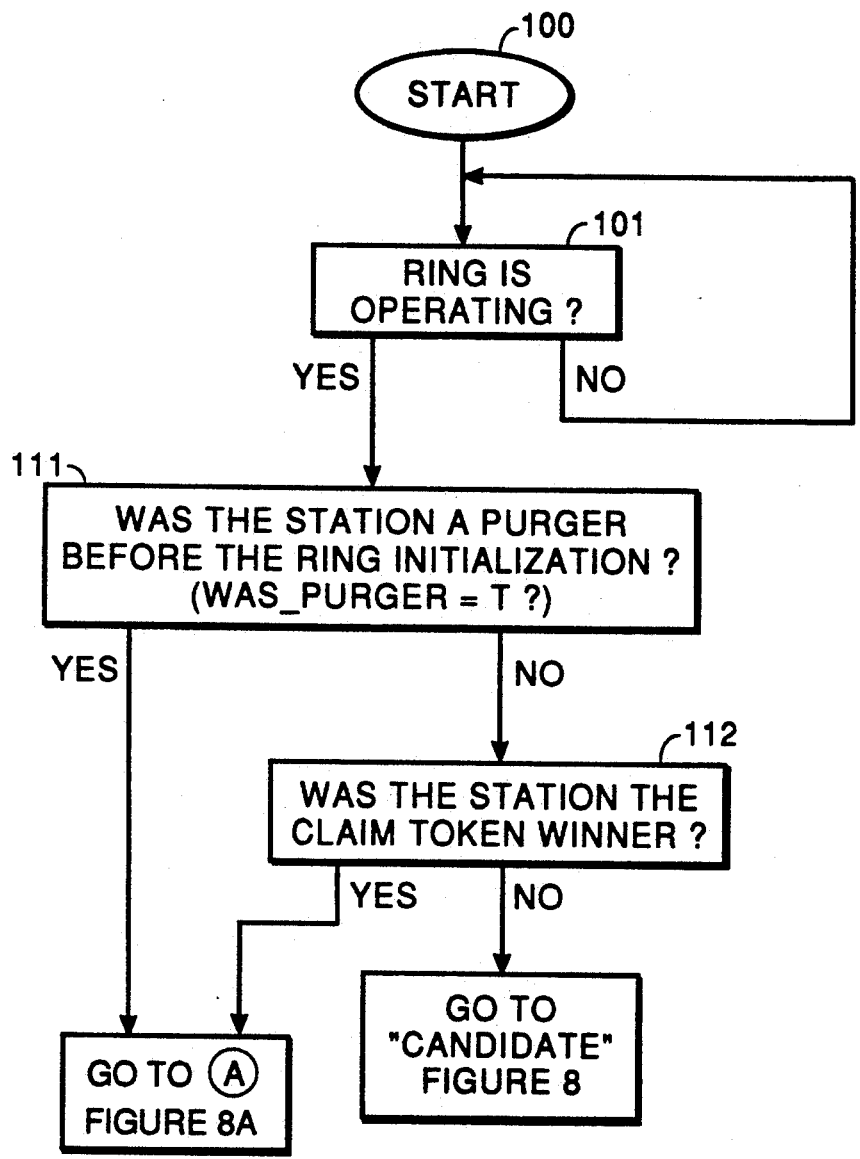
Figure 9:
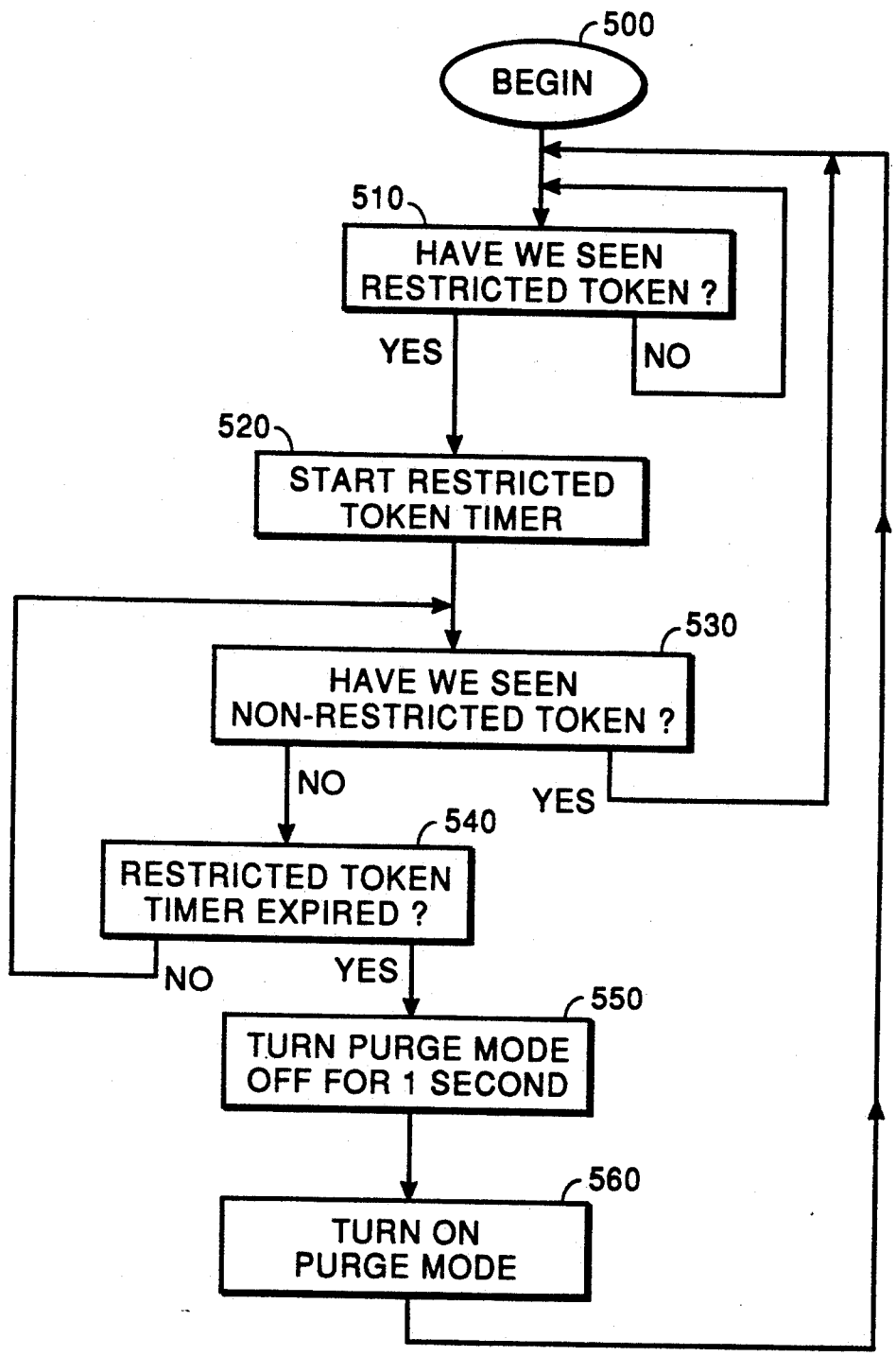
FIG. 9 is a flow chart of a method of detecting and removing no-owner restricted tokens.

A preferred enhancement to the invention which prevents such recurring ring initializations is the Failed Purger Procedure shown in FIG. 8C. The station enters this procedure (point "C" in FIG. 8C) when it detects a serious error condition. Specific error conditions which might invoke the Failed Purger Procedure are described in Sections 10 and 11, below.

When the Failed Purger Procedure is invoked, the station turns off its purge mode, i.e., it stops any ongoing purging operation (step 202). This forces a different station to become the purger. It also resets the WAS_PURGER flag to "FALSE" (step 202) so that, in the event of a ring initialization, the station will not automatically become a purger again (step 111).

Next, the station must pass the Duplicate Address test (DAT) described in Section 10. After the station passes the DAT, the station then becomes a non-candidate (step 212). As a non-candidate, the station cannot become a purger until the purger election algorithm restarts after a ring initialization (step 110), or until the station stops receiving purger hello frames from the new purger and thus becomes a candidate station (steps 148, 150, 250, 252, 219, 220).

Since a different station becomes a purger when the Failed Purger Procedure is invoked, recurring ring initializations caused by error conditions specifically involving an individual purger station are prevented.

10. Duplicate Address Test

The ANSI standard FDDI protocol specifies a duplicate address test (DAT) to be performed by the SMT station management protocol of the network controller within each station. Each station which implements the test includes a register for storing a parameter named DAT having one of three values: PASS, FAIL, or UNK (unknown). FAIL means that the station's address is the same as another station's address on the ring. PASS means that the station has been determined to have a unique address. UNK means that no determination has been made yet.

A preferred enhancement of the present invention uses DAT in two ways: (1) the station periodically checks the value of DAT throughout the time that the station is a purger, a candidate, or a non-candidate. If DAT ever equals FAIL, the station invokes the Failed Purger Procedure described above in Section 9 and FIG. 8C. (2) Once the Failed Purger Procedure is invoked, the station will not be permitted to exit this procedure and become a non-candidate until the station passes the Duplicate Address Test, i.e., until DAT=PASS.

Aspect (1) of the enhancement is implemented via a Failure Detection Subroutine shown in FIG. 7. This Subroutine is executed repeatedly whenever the station is a purger (steps 230 and 236 in FIG. 8A) a candidate (steps 219 and 222 in FIG. 8), or a non-candidate (step 242 in FIG. 8B).

Referring to FIG. 7, the Failure Detection Subroutine first checks the value of the DAT parameter (step 302). If DAT=FAIL, then the station invokes the Failed Purger Procedure (step 304). If DAT=PASS or DAT=UNK, then the station tests whether the ring is currently operating (step 306). If the station passes this test, the station continues whatever operation it was performing before entering the Subroutine (step 308).

If the ring has ceased operating (step 306), the station stops purging (step 310), and then restarts the purger election process (step 314 in FIG. 7; step 110 in FIG. 8).

Aspect (2) of the enhancement is implemented by adding steps to the Failed Purger Procedure previously described in Section 9 and FIG. 8C. Specifically, once the Failed Purger Procedure has been invoked, the station is not permitted to exit this Procedure until the Duplicate Address Test is passed, i.e., until the value of the DAT parameter equals PASS (step 206). More preferably, after the station first passes the Duplicate Address Test, the station should wait a predetermined time period determined by a "DAT Valid" timer (step 208), during which period the station continuously checks the value of the DAT parameter (steps 206, 210). In the preferred embodiment, the period of the DAT Valid timer is five minutes. If DAT remains equal to PASS throughout the period of the DAT Valid timer, then the station may exit the Failed Purger Procedure and become a non-candidate (step 212). However, if at any time during this period the value of DAT reverts to FAIL or UNKNOWN, then the entire Duplicate Address Test cycle is repeated (step 214).

11. Ring Operation Repeatedly Fails Immediately After Initialization

As explained in Section 9, above, certain error conditions in the ring which specifically involve the individual station operating as the purger can cause repeated ring initializations. The error condition may never be corrected because the same station becomes a purger after each initialization.

In a preferred enhancement to the invention, the purger station detects when an excessive number of ring operation failures occur within short time intervals of each other. When this condition is detected, the purger station invokes the Failed Purger Procedure described in Section 9 and FIG. 8C, so that this station becomes a non-candidate and a different station becomes a purger.

Specifically, each time the purger station enters the purger mode after the ring operation has been restarted, the station increments a counter called P_ATTEMPT (step 231 in FIG. 8A). The station then compares the count value with a predetermined number called P_LIMIT (step 233). If the count exceeds P_LIMIT, the purger station invokes the Failed Purger Procedure (step 235) and ceases to be a purger. Otherwise, the station continues performing as a purger (steps 237 et seq.).

While the station operates as a purger, it periodically transmits purger hello frames at intervals determined by the purger hello timer (steps 132, 136, 138). The first time (and each subsequent time) the purger hello timer expires, the station resets the P_ATTEMPT counter to zero (step 238). Therefore, the counter cannot increment beyond the value of "one" unless the purger operation is interrupted by the ring's becoming initialized or inoperative sooner than one purger hello timer period following the station's becoming a purger. Also, the count is reset to zero each time the station becomes a candidate (step 220 in FIG. 8), a non-candidate (step 240 in FIG. 8B), or a failed purger (step 202 in FIG. 8C). Therefore, P_ATTEMPT counts the number of consecutive times the station oscillates between: (1) being a purger after ring start-up, and (2) suffering an interruption in ring operation before the first purger hello timer period has elapsed. The predetermined value of P_LIMIT should be chosen to be the maximum number of such oscillation that will be tolerated before the station disqualifies itself from being a purger. The currently preferred value of P_LIMIT is 5.

12. Limiting Purge Time

A purging operation performed as described in Section 2 or 3, above, can possibly experience an error condition on the ring which causes the purging operation to continue indefinitely. For example, this could occur if a second station stripped all frames transmitted by the purging station, so that the purging station never received its purge marker frames. In this case, one or more of the stations on the ring immediately downstream from the purging station will receive nothing but idle frames. One of these stations eventually will force a ring initialization when its TVX (transmission valid) timer times out, in accordance with the ANSI standard FDDI protocol.

A preferred solution to this problem is to impose an upper limit on how long a station may continue a purge operation. This may be implemented by a timer which is started during each purge operation when the purging station transmits the first purge marker frame for that purge operation. When the timer expires, the station will stop the purge operation, notwithstanding that it may not yet have received its purge marker frames.

Figure 3A:
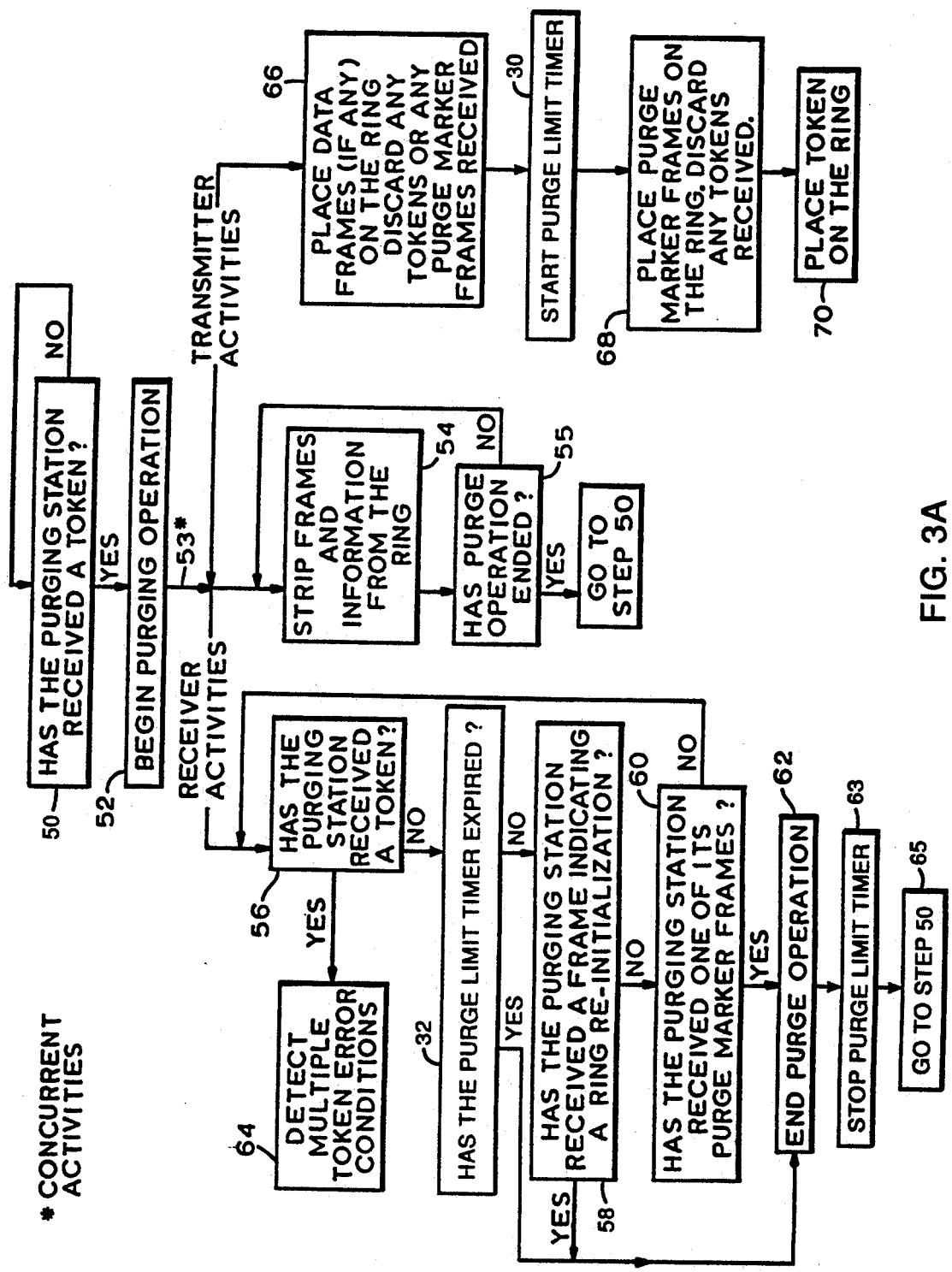
FIG. 3A is a flow chart of the purging method shown in FIG. 3, including a further enhancement to limit the maximum duration of a purge operation.

FIG. 3A shows the purging operation previously described in Section 2, but modified to include a time limit on the purging operation. The station starts the purge limit timer (step 30) at about the same time it begins to transmit purge marker frames (step 68). If the purge limit timer expires (step 32) while the station is still waiting to receive its purge marker frames (steps 56, 58, 60), the station ends the purge operation (steps 62, 63, 65). The period of the purge limit timer should be greater than the ring latency time, and less than the period of the TVX timer. The preferred period of the purge limit timer is 2 milliseconds.

13. No-Owner Restricted Tokens

Some conventional ring network protocols define a second type of token called a "restricted token". According to these protocols, a restricted token may be captured only by certain privileged stations. The purpose of the restricted token is to permit the privileged stations to exchange urgent messages without delay caused by other stations' also transmitting their messages. When a privileged station needs to send such an urgent message, it captures the "ordinary" (non-restricted) token and then transmits its message followed by a restricted token. When the urgent communication is finished, one of the privileged stations removes the restricted token from the ring and transmits an non-restricted token, thereby restoring normal ring operation.

There is a slight chance that a failure in a privileged station may cause it to transmit a restricted token, but then leave it on the ring indefinitely without replacing it with an "ordinary" (non-restricted) token. (A restricted token which is "forgotten" by its originating station is called a "no-owner" restricted token.) If this condition persisted forever, no station would be able to capture the token and transmit any messages, so the ring would contain nothing but the restricted token and idle frames.

Normally, this condition is corrected by the TVX (transmission valid) timer in each station on the ring. According to conventional ring protocols, a restricted token is treated the same as an idle frame by the TVX timer process. Therefore, if a station's TVX timer expires before the station receives any frames other than idle frames or restricted tokens, the station will force a ring initialization, which will eliminate the no-owner restricted token.

However, if the malfunctioning privileged station which originated the no-owner restricted token also transmitted one or more frames, and if the station's malfunction caused it to leave these frames on the ring indefinitely as "no-owner" frames, then the method described in the preceding paragraph will not work successfully. Specifically, the presence of the "no-owner" frames will prevent any station's TVX timer from timing out, so that no ring initialization will occur to eliminate the no-owner restricted token.

Unfortunately, a purger station as described in Sections 2-12, above, also can prevent the TVX timer from timing out. Specifically, if the purger station starts a purge operation whenever it receives either an ordinary token or a restricted token, then the purger station will transmit a purge marker frame every time it receives a restricted token. Just like the no-owner frames described in the preceding paragraph, the presence of purge marker frames on the ring will prevent any station's TVX timer from timing out, so that no ring initialization will occur to eliminate the no-owner restricted token.

A preferred solution to both of the problems described in the two preceding paragraphs is to modify the purging procedure in each station so that, while a station is performing a purging operation, it either counts the number of times it receives a restricted token without receiving an ordinary (non-restricted) token, or else it measures the time elapsed since receiving a restricted token without subsequently receiving an ordinary token. Measuring the elapsed time is preferable to counting the number of restricted tokens received. When the count or time period exceeds a predetermined limit (preferably 10,000 counts or one second, respectively), the station stops purging. The station may resume purging as soon as it receives an ordinary token or a predetermined time period elapses. The latter period should be greater than the maximum possible period of the TVX timer of any station on the ring.

An alternative solution would be for every station on the ring, not just the purger, to detect the receipt of a restricted token not followed by an ordinary token within a predetermined time period thereafter. After detecting this condition, the station would force a ring initialization to eliminate the no-owner restricted token.

14. Recapitulation of Ring Purger Invention

The purging stations transparently strip no-owner frames from the ring, and thus normal ring operations are not interrupted. The no-owner frames are stripped before they can completely traverse the ring a second time, that is, after they have traveled from source station to destination station and passed the source station without being stripped. Accordingly, the frames are received by the destination stations at most twice.

Using the current invention, the purging stations also detect multiple tokens on the ring. The stations allow normal ring operations to correct the condition, and affirmatively correct it with a ring initialization only if it persists. The purging stations thus perform purging operations and multiple token detection operations without unnecessarily interrupting normal ring operations. Earlier purging methods do not perform multiple token detection. Accordingly, the multiple token error condition may continue unchecked for a significant period of time, resulting in lost data.

The foregoing description has been limited to a number of specific embodiments of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A station for a token-ring network, comprising:
   A. token capturing means for detecting a token received by the station over the network and for removing the token from the network;
   B. transmitting means for transmitting one or more frames onto the network after the token capturing means has removed the token, and then transmitting the token onto the network;
   C. receiving means for detecting when the station has received over the network said one or more frames transmitted by the transmitting means; and
   D. purging means for performing purging operations whenever the purging means strips from the network all data frames and remnants of frames received by the station between the beginning of each purging operation and the end of that purging operation, wherein the purging means begins a purging operation when a token is captured by the token capturing means, and wherein the purging means ends any ongoing purging operation when the receiving means detects that said one or more frames has been received;
   E. wherein, the purging means further includes a purge operation timer, operable to end each purging operation no later than a predetermined time after that purging operation began, regardless of whether any of said one or more frames have been received, and wherein the predetermined time is greater than the maximum time required for a frame to propagate all the way around the token ring network when the network is not malfunctioning.

2. A station for purging no-owner frames from a token ring network, comprising:
   receiving means for receiving information on the network;
   token capturing means for removing the network a token received by the receiving means;
   marker transmitting means for transmitting a predetermined number of purge marker frames onto the network after the received token has been removed;
   token transmitting means for transmitting a token onto the ring after the purge marker frames have been transmitted;
   purging means, responsive to a purge operation termination signal, for performing a purge operation beginning when the received token is removed and ending when the purging means receives a purge operation termination signal, wherein during the purge operation the purging means removes from the network all data frames and fragments of frames received by the receiving means;
   means for detecting when the receiving means has received a second predetermined number of purge marker frames and thereupon sending a purge operation termination signal to the purging means; and
   purge limit timer means for sending a purge operation termination signal to the purging means a predetermined time period after the beginning of the purge operation, whereby the station will terminate a purging operation after the predetermined time period in the event of an error condition that precludes receipt of the purge marker frames.

3. A station as defined in claim 2, wherein:
   the station further comprises means for initiating operation of the purge limit timer means at the start of each purge operation; and
   the purge limit timer means generates purge operation termination signal when the predetermined time period has elapsed following the start of the purge operation.

4. A station as defined in claim 3, wherein:
   the predetermined time period for terminating a purge operation is greater than the ring latency time and less than the a valid transmission time period (TVX) used in the station to trigger ring-reinitialization in the event that the station has not received a well-formed frame during the TVX period.

5. A first station, for purging no-owner frames from a token ring network having multiple additional stations, the first station comprising:
   means for selecting, in cooperation with the additional stations, which station is to operate as a purging station;
   receiving means for receiving information on the network;
   token recapturing means for removing from the network a token received by the receiving means;
   marker transmitting means for transmitting a predetermined number of purge marker frames have been transmitted;
   token transmitting means for transmitting a token onto the ring after the purge marker frames have been transmitted;
   purging means, responsive to a purge operation termination signal, for performing a purge operation beginning when the received token is removed and ending when the purging means receives a purge operation termination signal, wherein during the purge operation the purging means removes from the network all data frames and fragments of frames received by the receiving means;

means for detecting when the receiving means has received a second predetermined number of purge marker frames and thereupon sending a purge operation termination signal to the purging means; and means for disabling purging by the first station, and rendering the first station unavailable for subsequent selection as a purging station, in the event that a selected error condition occurs.

6. A station as defined in claim 5, wherein:

the first station further comprises means for performing a duplicate address test, to determine whether the first station's address is the same as the address of one of the additional network stations; and the means for disabling purging is activated upon detection of a duplicate address.

7. A station as defined in claim 6, wherein:

the means for disabling purging is effective to render the first station unavailable for selection as a purging station until the first station passes the duplicate station test and continues to pass the duplicate station test for a predetermined time.

8. A station as defined in claim 5, wherein:

the first station further comprises means for detecting when a preselected number of ring operation failures occur within short time intervals of each other; and the selected error condition that activates the means for disabling purging is the detection of the preselected number of ring operation failures.

9. A station for purging no-owner frames from a token ring network, comprising:

receiving means for receiving information on the network;

token capturing means for removing from the network a token received by the receiving means;

marker transmitting means for transmitting a predetermined number of purge marker frames onto the network after the received token has been removed;

token transmitting means for transmitting a token onto the ring after the purge marker frames have been transmitted;

purging means, responsive to a purge operation termination signal, for performing a purge operation beginning when the received token is removed and ending when the purging means receives a purge operation termination signal, wherein during the purge operation the purging means removes from the network all data frames and fragments of frames received by the receiving means;

means for detecting when the receiving means has received a second predetermined number of purge marker frames and thereupon sending a purge operation termination signal to the purging means; and means operative during a purge operation, for temporarily suspending purging upon detection of a restricted token on the ring without detection of a non-restricted token.

10. A station as defined in claim 9, wherein the means for temporarily suspending purging includes:

means for detecting a restricted token without detecting a subsequent non-restricted token within a selected time limit.

11. A station as defined in claim 9, wherein the means for temporarily suspending purging includes:

means for detecting a selected number of restricted tokens without detecting a non-restricted token.

12. A method for purging no-owner frames from a token ring network, comprising the steps of:

receiving information on the network;

capturing a token received in the receiving step, by removing it from the network;

transmitting a predetermined number of purge marker frames onto the network after the received token has been removed;

transmitting a token onto the ring after the purge marker frames have been transmitted;

initiating a purge operation, beginning when the received token is removed and ending upon receipt of a purge operation termination signal, wherein during the purge operation all data frames and fragments of frames received from the network are removed;

detecting the receipt of a second predetermined number of purge marker frames and thereupon generating a purge operation termination signal; and generating a purge operation termination signal a predetermined time period after the beginning of the purge operation, whereby the station will terminate a purging operation after the predetermined time period in the event of an error condition that precludes receipt of the purge marker frames.

13. A method as defined in claim 12, wherein:

the method further comprises initiating operation of a purge limit timer at the start of each purge operation; and the step of generating a purge operation termination signal when the predetermined time period has elapsed following the start of the purge operation, is performed by the purge limit timer.

14. A method as defined in claim 13, wherein:

the predetermined time period for terminating a purge operation is greater than the ring latency time and less than the a valid transmission time period (TVX) used in the station to trigger ring re-initialization in the event that the station has not received a well-formed frame during the TVX period.

15. A method of operation of a first station in a token ring network, to purge no-owner frames from the network, which has multiple additional stations, the method comprising:

selecting, in cooperation with the additional stations, which station is to operate as a purging station;

receiving information on the network;

capturing a token received in the receiving step, by removing it from the network;

transmitting a predetermined number of purge marker frames onto the network after the received token has been removed;

transmitting a token onto the ring after the purge marker frames have been transmitted;

initiating a purge operation, beginning when the received token is removed and ending upon receipt of a purge operation termination signal, wherein during the purge operation all data frames and fragments of frames received from the network are removed;

detecting the receipt of a second predetermined number of purge marker frames and thereupon generating a purge operation termination signal; and disabling purging by the first station, and rendering the first station unavailable for subsequent selection as a purging station, in the event that a selected error condition occurs.

16. A method as defined in claim 15, wherein:

the method further performing a duplicate address test, to determine whether the first station's address is the same as the address of one of the additional network stations; and the step of disabling purging is performed upon detection of a duplicate address.

17. A method as defined in claim 16, wherein:

the step of disabling purging is effective to render the first station unavailable for selection as a purging station until the first station passes the duplicate station test and continues to pass the duplicate station test for a predetermine time.

18. A method as defined in claim 15, wherein:

the method further comprises detecting when a preselected number of ring operation failures occur within short time intervals of each other; and the selected error condition that results in performance of the step of disabling purging is the detection of the preselected number of ring operation failures.

19. A method for purging no-owner frames from a token ring network, comprising the steps of:

receiving information on the network;

capturing a token received in the receiving step, by removing it from the network;

transmitting a predetermined number of purge marker frames onto the network after the received token has been removed;

transmitting a token onto the ring after the purge marker frames have been transmitted;

initiating a purge operation, beginning when the received token is removed and ending upon receipt of a purge operation termination signal, wherein during the purge operation all data frames and fragments of frames received from the network are removed;

detecting the receipt of a second predetermined number of purge marker frames and thereupon generating a purge operation termination signal; and during a purge operation, temporarily suspending purging upon detecting of a restricted token on the ring without detection of a non-restricted token.

20. A method as defined in claim 19, wherein the step of temporarily suspending purging includes:

detecting a restricted token without detecting a subsequent non-restricted token within a selected time limit.

21. A method as defined in claim 19, wherein the step of temporarily suspending purging includes:

detecting a selected number of restricted tokens without detecting a non-restricted token.

* * * * *